(12) United States Patent
Kodihalli

(10) Patent No.: US 11,393,024 B1
(45) Date of Patent: Jul. 19, 2022

(54) SYSTEM AND METHOD FOR SEMANTIC REPRESENTATION AND EXECUTION OF AGREEMENTS ON A DISTRIBUTED LEDGER

(71) Applicant: Openrisk Technologies Inc., Franklin Park, NJ (US)

(72) Inventor: Narasimha Kodihalli, Franklin Park, NJ (US)

(*) Notice: Subject to any disclaimer, the term of this patent is extended or adjusted under 35 U.S.C. 154(b) by 0 days.

(21) Appl. No.: 16/775,483

(22) Filed: Jan. 29, 2020

Related U.S. Application Data

(60) Provisional application No. 62/797,994, filed on Jan. 29, 2019.

(51) Int. Cl.
*G06Q 40/02* (2012.01)
*G06N 20/00* (2019.01)

(52) U.S. Cl.
CPC ........... *G06Q 40/025* (2013.01); *G06N 20/00* (2019.01)

(58) Field of Classification Search
CPC .... G06Q 40/025; G06Q 20/389; G06Q 20/08; G06N 3/08
See application file for complete search history.

(56) References Cited

U.S. PATENT DOCUMENTS

| 11,188,977 B2* | 11/2021 | Youb .................... G06Q 30/02 |
| 2018/0268506 A1* | 9/2018 | Wodetzki ............. G06V 30/413 |
| 2019/0188399 A1* | 6/2019 | Palaniappan ......... H04L 9/3239 |
| 2019/0236598 A1* | 8/2019 | Padmanabhan .......... G06N 3/08 |

OTHER PUBLICATIONS

Macrinici, Daniel; Cristian Cartofeanu; and Shang Gao. "Smart Contract Applications within Blockchain Technology: A Systematic Mapping Study," Telematics and Informatics, Department of Informatics, Orebro University, Orebro, Sweden (Oct. 6, 2018). (Year: 2018).*
Fries, Christian et al., "Implementing a Financial Derivative as Smart Contract," https://arxiv.org/pdf/1903.00067.pdf (Feb. 25, 2019). (Year: 2019).*

* cited by examiner

*Primary Examiner* — Elizabeth H Rosen
(74) *Attorney, Agent, or Firm* — Graeser Associates International Inc.; D'Vorah Graeser

(57) ABSTRACT

A system and method for transformation and rationalization of financial agreements, such as derivatives agreements such as CSA (Credit Support Annex) or commercial loan agreements and other related agreements into a knowledge graph, through the application of automation tools, for subsequent recording of such knowledge graph on a distributed ledger or blockchain network and facilitating risk management operations such as collateral and liquidity management. Non-limiting examples of such automation tools include semantic web, natural language processing, machine learning, neural network, and other automation tools.

31 Claims, 19 Drawing Sheets

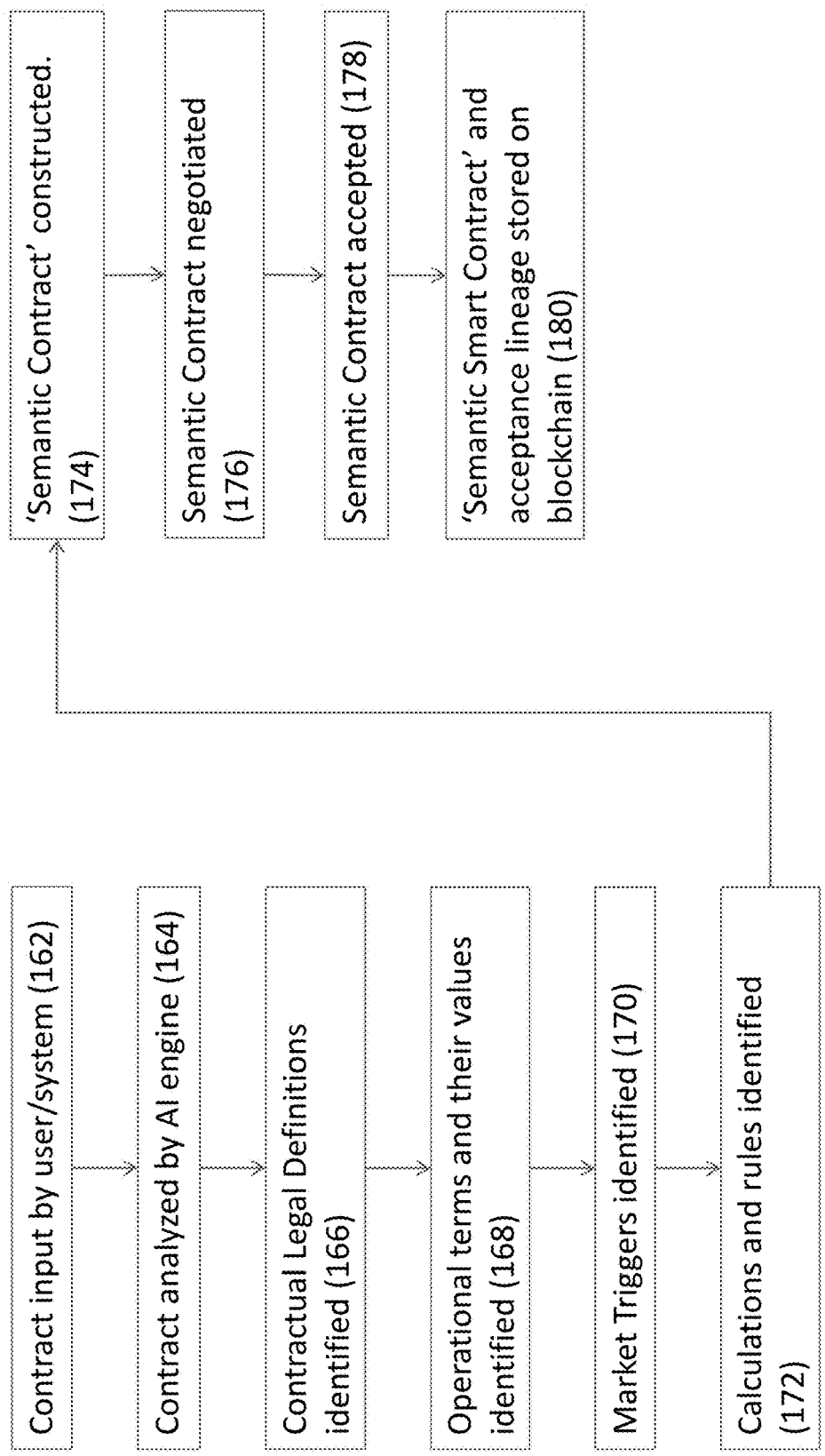
Figure 1C (general flow)

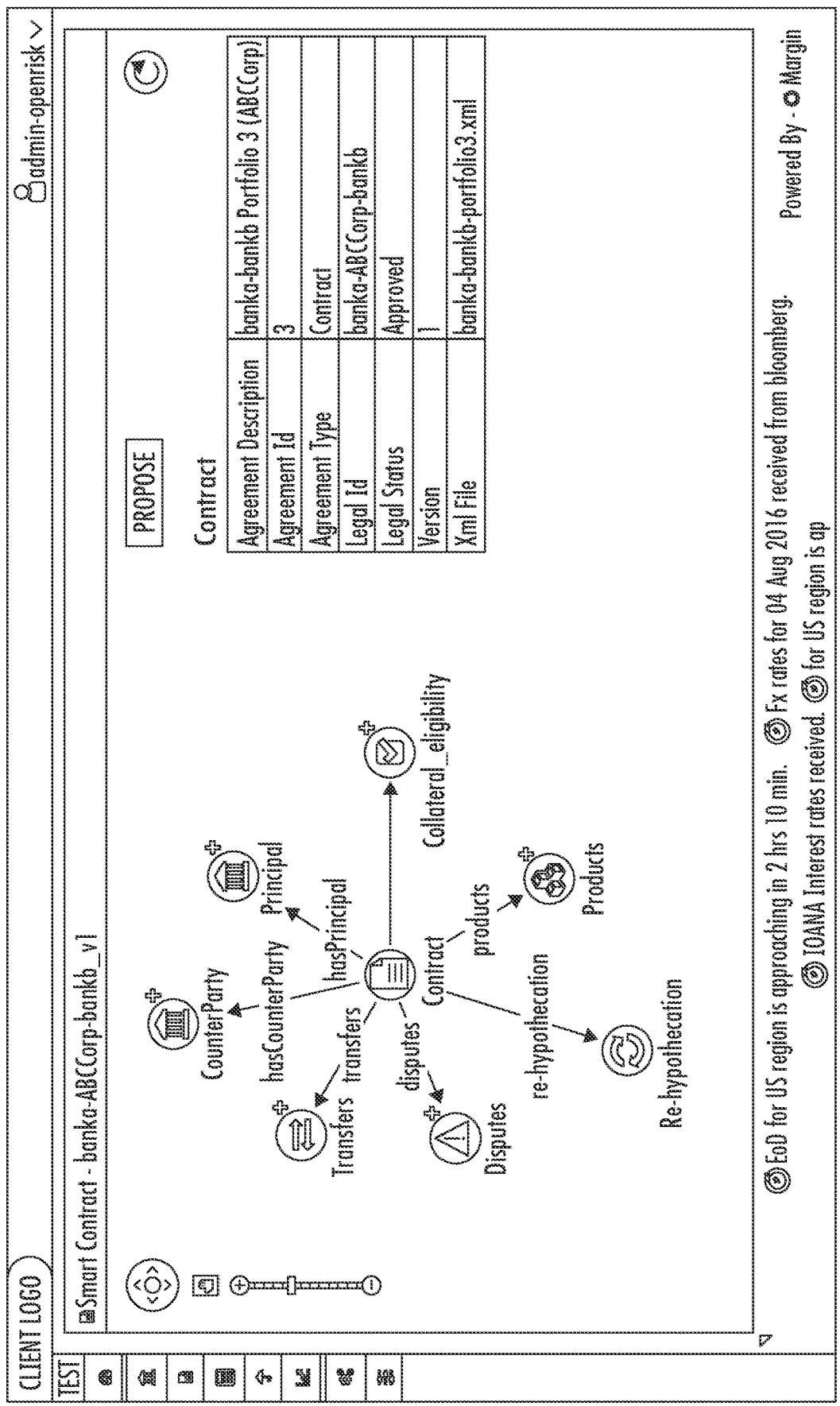
FIG. E

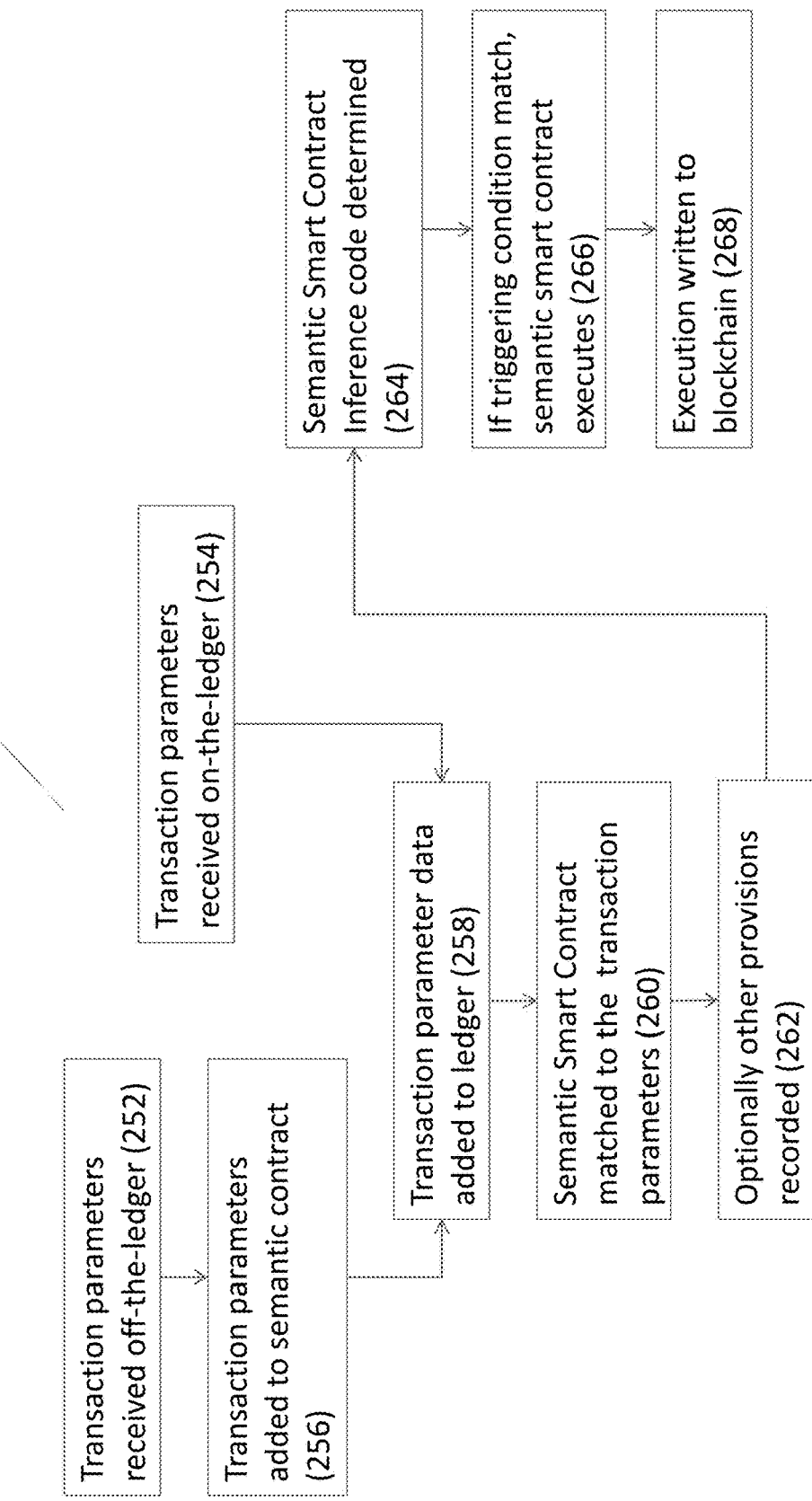
Figure 2B (semantic smart contract execution flow)

Figure 3 (AI engine in detail)

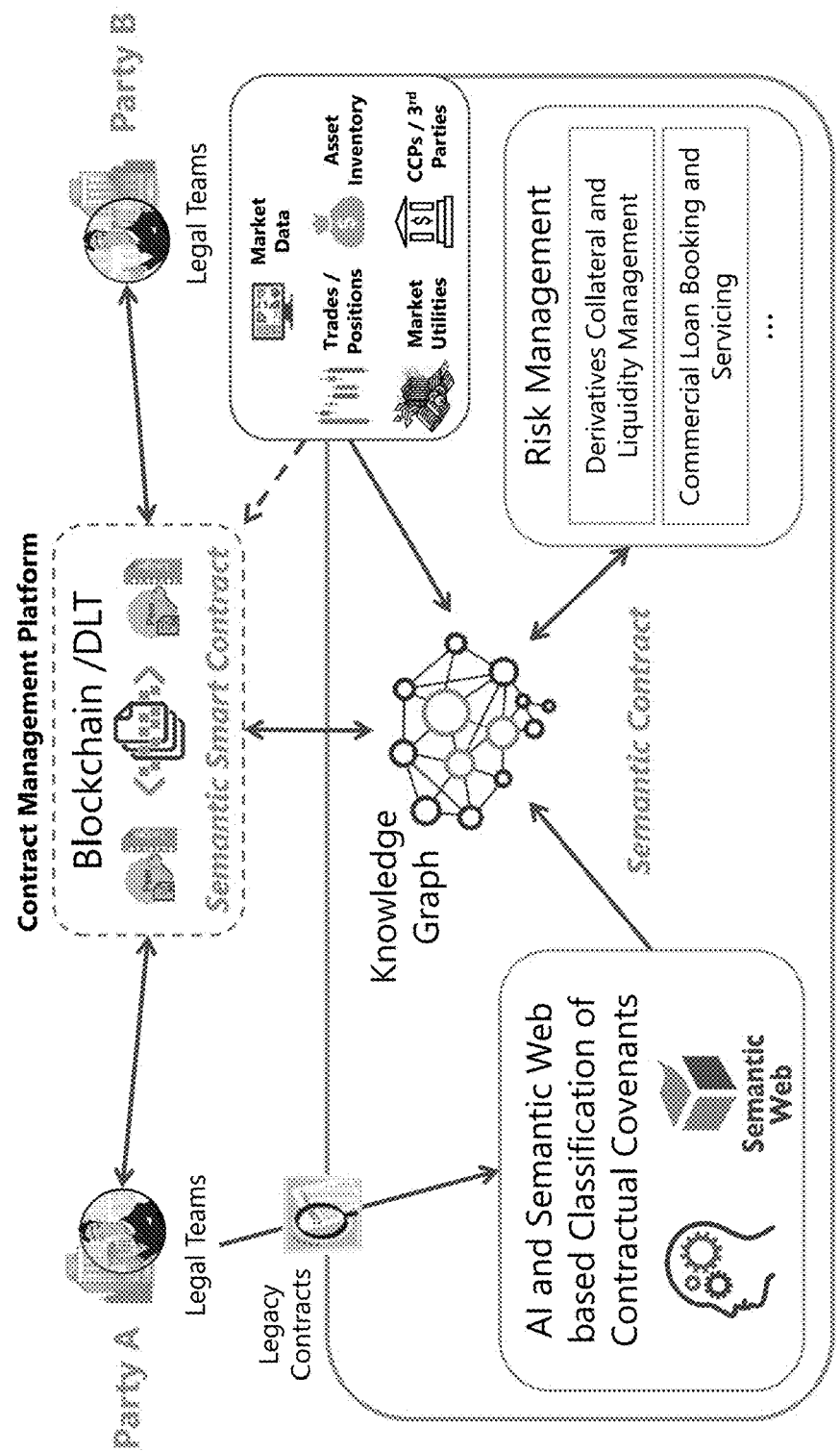
Figure 4 (overall system in detail)

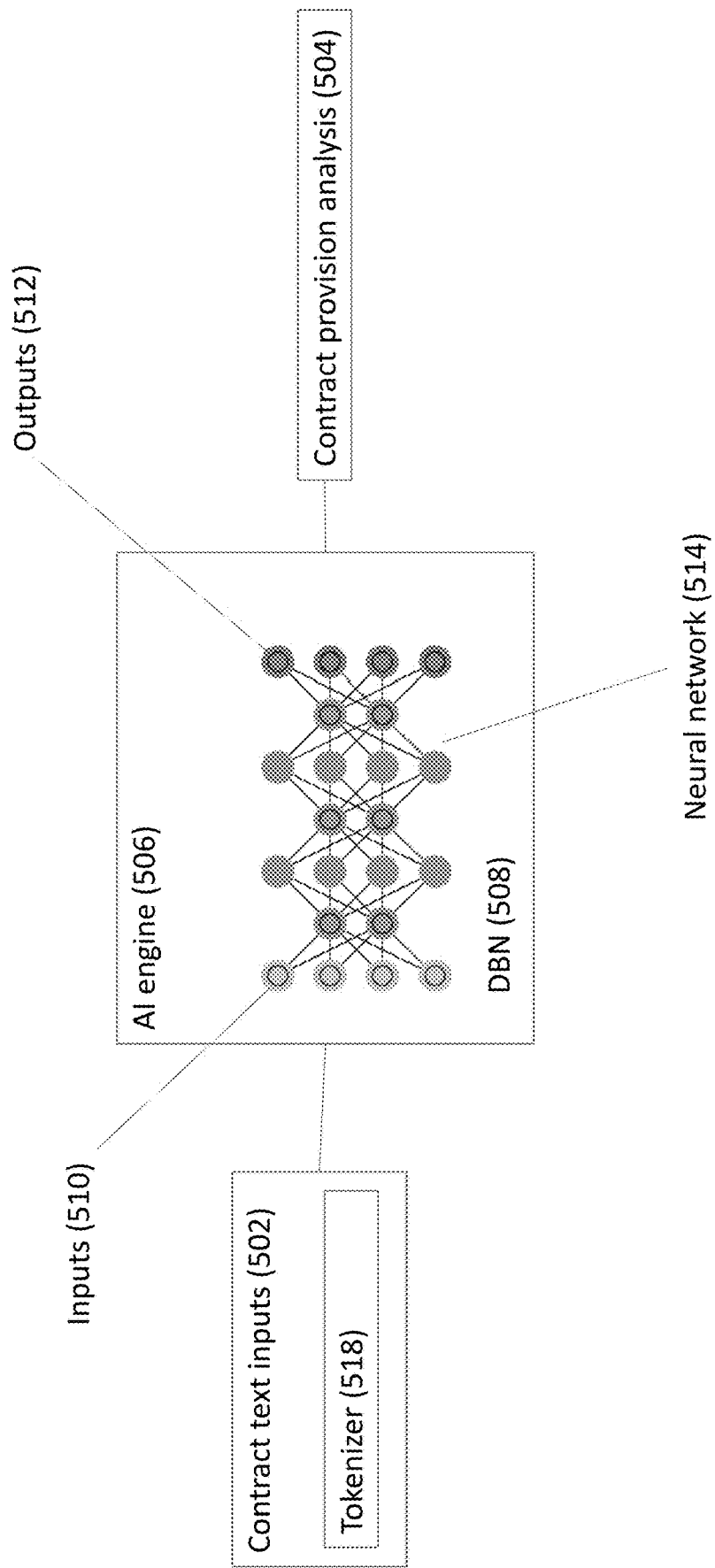
Figure 5A – AI system details I

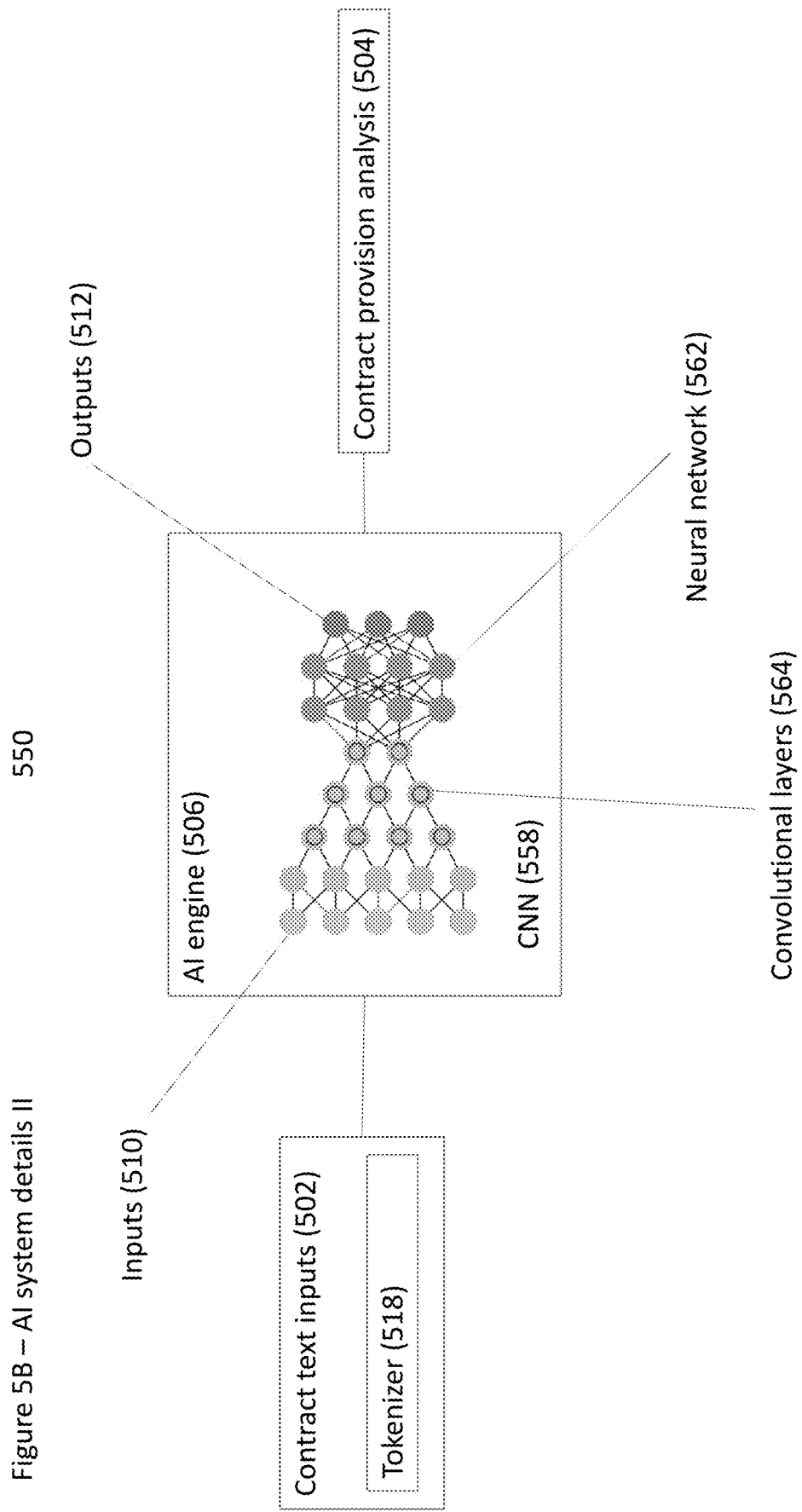
Figure 5B – AI system details II

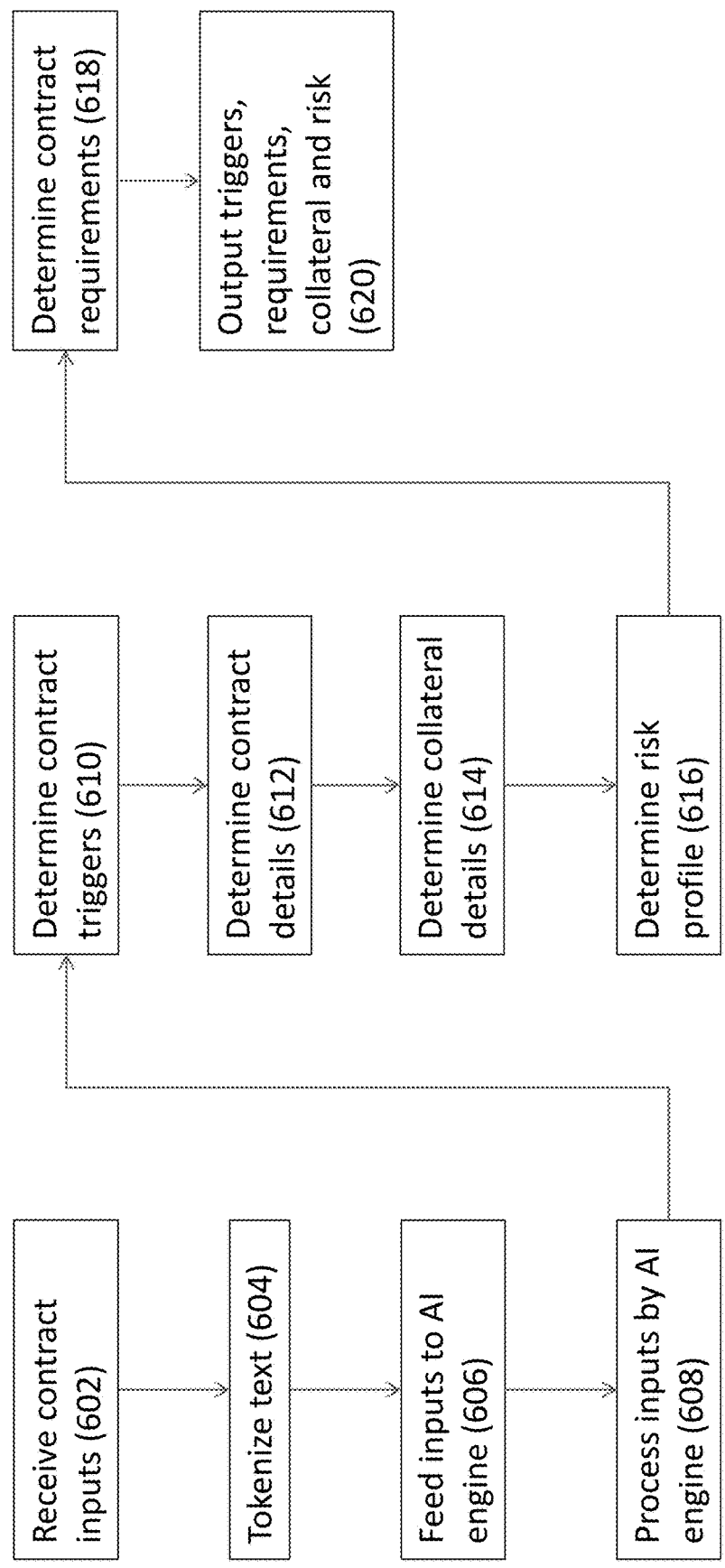
Figure 6A – AI flow details

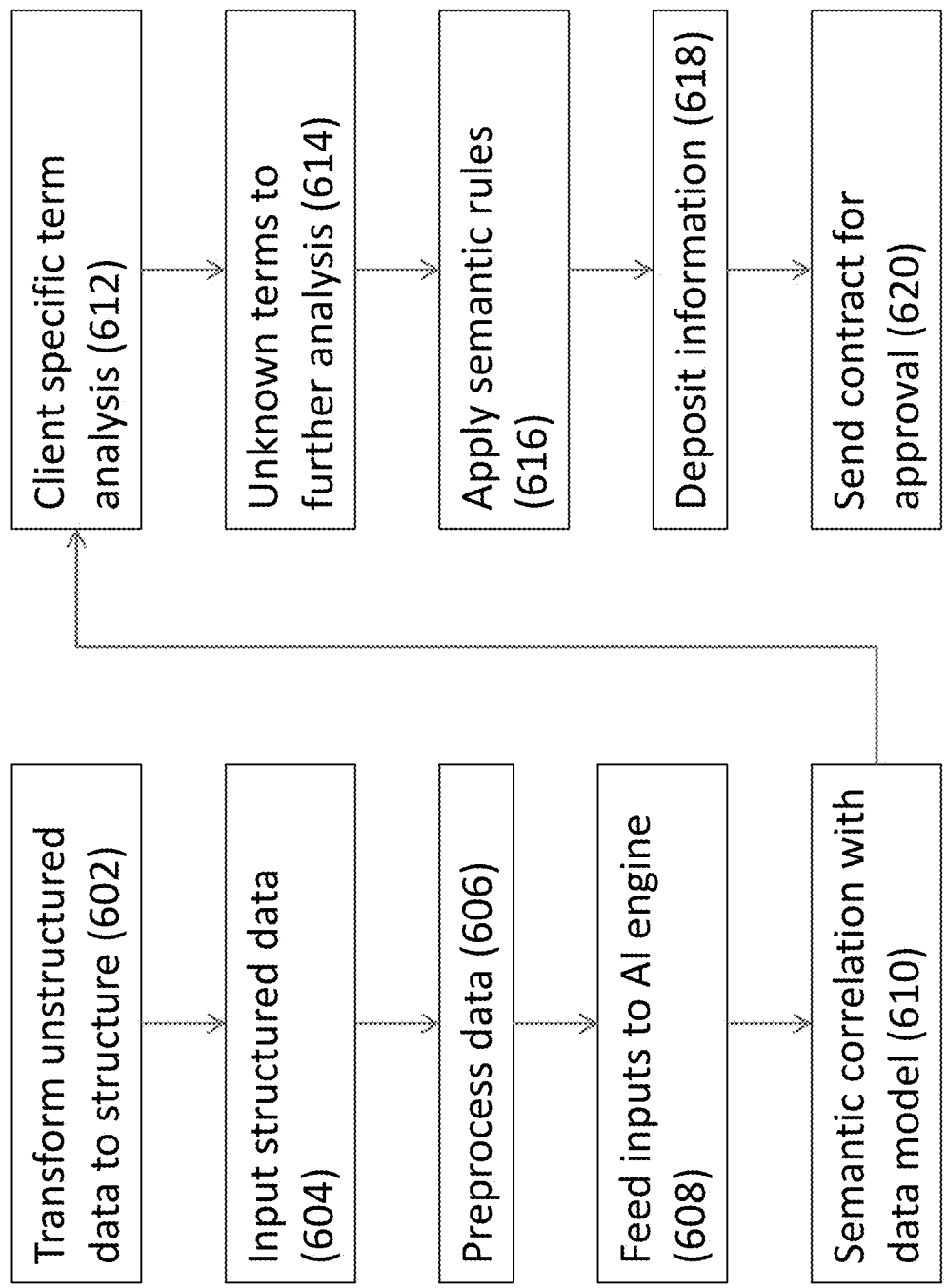
Figure 6B – AI data sources input flow

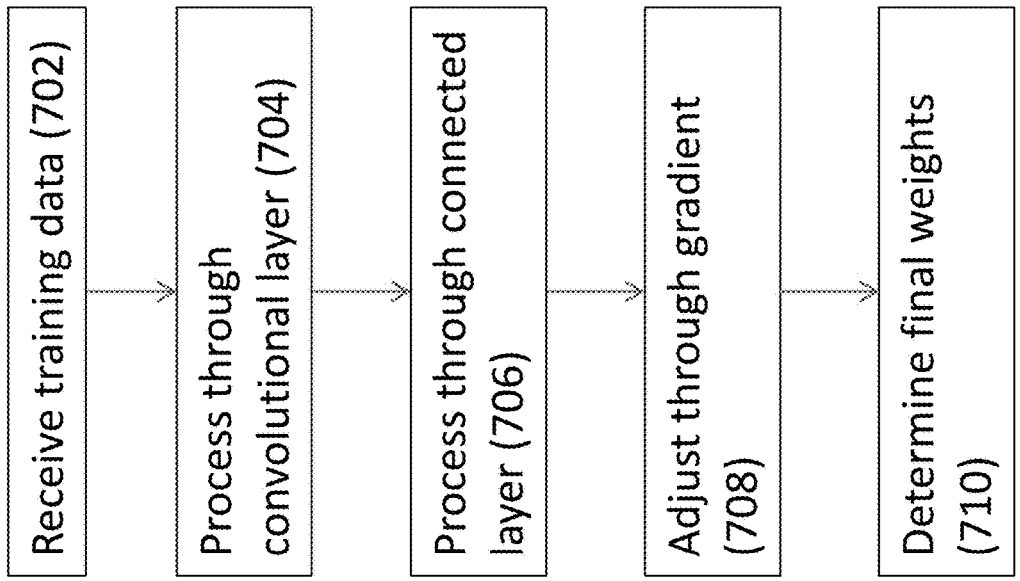
Figure 7 – AI training details

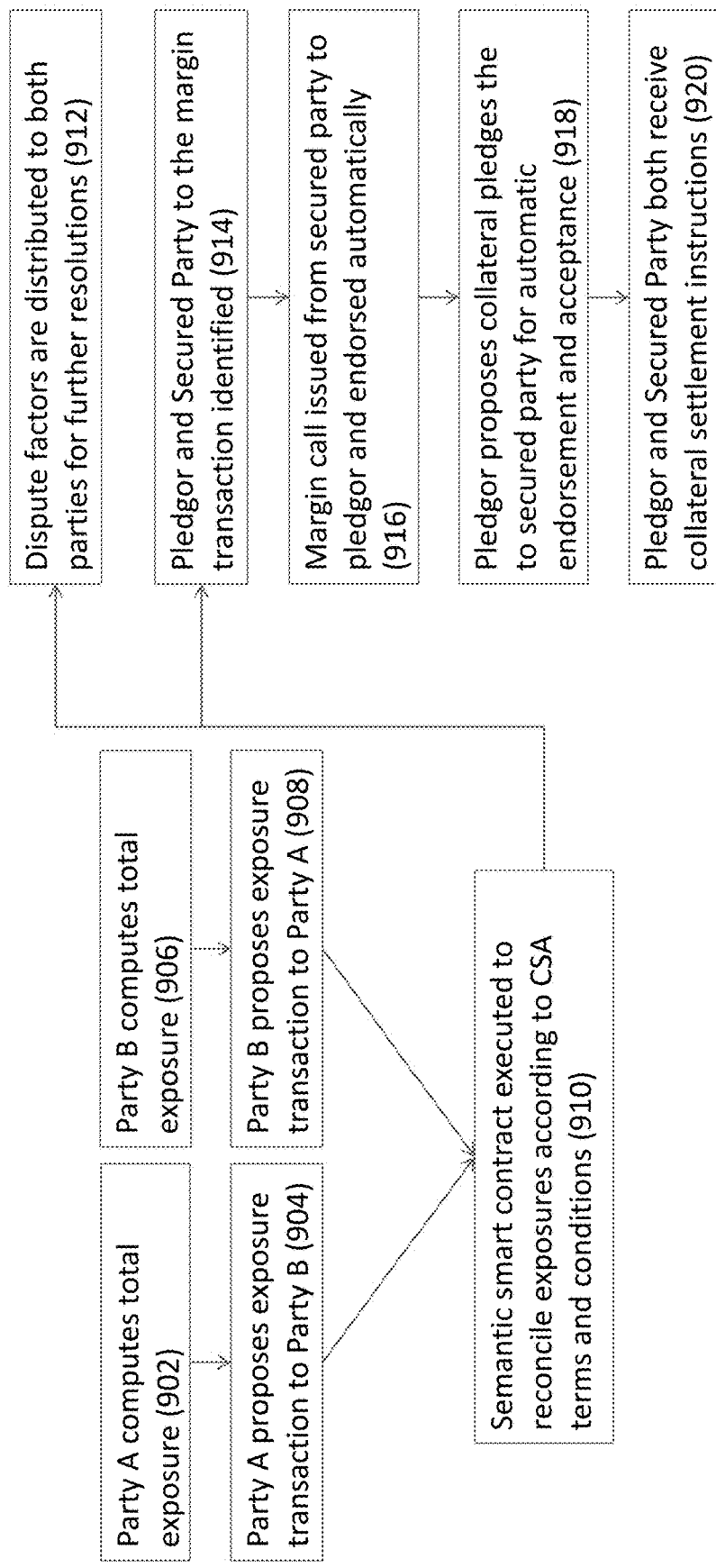
Figure 9 (blockchain margin workflow)

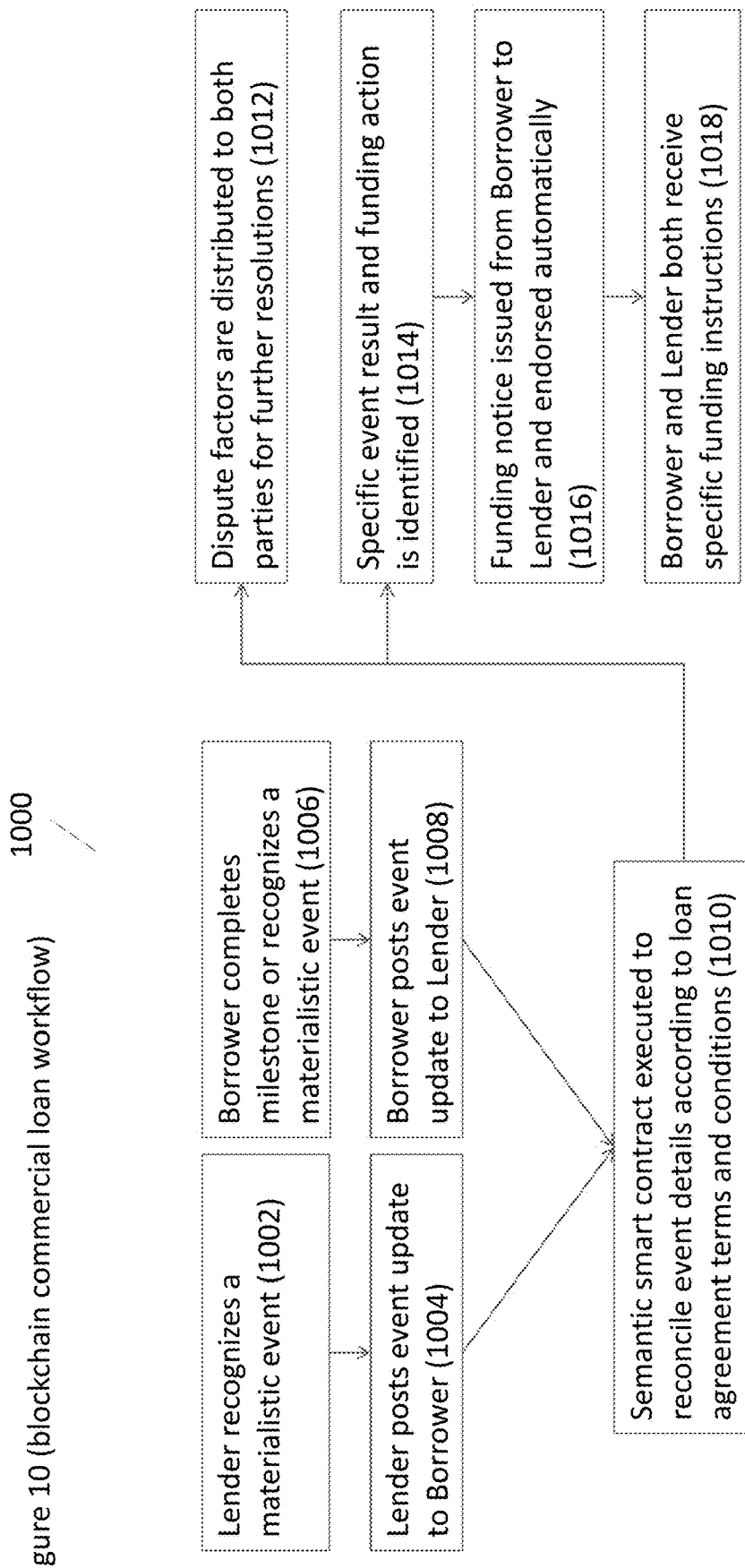
Figure 10 (blockchain commercial loan workflow)

SYSTEM AND METHOD FOR SEMANTIC REPRESENTATION AND EXECUTION OF AGREEMENTS ON A DISTRIBUTED LEDGER

FIELD OF THE INVENTION

The present invention, in at least some embodiments, is of a system and method for transformation and rationalization of agreements through a semantic process and in particular, of such a system and method for storage and optionally execution of such agreements on a distributed ledger.

BACKGROUND OF THE INVENTION

Financial Derivatives are vital to global economic activities and growth. Over-The-Counter (OTC) Derivatives in particular form the largest financial instrument, by notional amounts, and play a critical role in reducing the uncertainty that comes from changing interest rates, exchange rates, credit, and commodity and equity prices. Derivatives are used by thousands of companies in all industries and all regions. By managing their risk and creating certainty, companies have the confidence to invest in future growth and job creation. Use of derivatives products and agreements are not limited to financial services sector but span across manufacturing, export/import, food production, energy, mortgage, transport, pensions, and insurance sectors to name a few.

Financial Derivatives Agreements are difficult to assess and manage, particularly now that banks and other financial institutions are coming under increased regulatory compliance requirements. Most financial derivatives agreements are bespoke in nature between contractual parties and no single standardized taxonomy of legal and operational covenants exist in practice. Lack of a market standard taxonomy combined with billions of pages of such agreements in use by global economic activities poses a high systemic risk. The nature of such risk was made obvious during the 2008-2009 global financial crisis as outlined by a report titled "Principles for effective risk data aggregation and risk reporting" by BCBS (Basel Committee on Banking Supervision) in January 2013 (https://www.bis.org/publ/bcbs239.pdf).

Derivatives risk management operations are not sufficiently efficient and so the cost of operations is increasing. Furthermore, each market participant potentially has access to a great deal of internal and external market and execution data and yet is unable to fully exploit this data for a variety of reasons. These reasons include the presence of a great deal of unstructured data and the lack of tools which can rationalize different types of data, both structured and unstructured. Legacy technology is particularly unsuitable for today's data analysis needs and yet hasn't been replaced because of a lack of suitable data analysis platforms.

Distributed ledger technology (DLT) can be used to build platforms which overcomes these drawbacks of currently available tools. Unfortunately, the currently proposed solutions that use DLT do so only to implement traditional processes onto the blockchain, without taking full advantage of the power of DLT. For example, U.S. Pat. No. 9,794,074 maintains the clearing house details in a trade or other transactions, but shifts storage of information to the blockchain. The novation process is performed through the blockchain, by splitting the transaction process into two branches, both managed by and through transactions with the clearing house.

U.S. Pat. No. 9,870,562 determines risk in an exchange of fiat currency and cryptocurrency, according to the amount of fiat currency and/or cryptocurrency. The method for determining risk is very general and includes for example general methods for guarding against fraud.

U.S. Ser. No. 10/108,954 focuses on verifiability of transactions on the blockchain, including with regard to on-chain, off-chain and side-chain transactions, but otherwise describes traditional methods for financial transactions.

U.S. Ser. No. 10/121,143 relates to a method for maintaining a record of ownership and custody on the blockchain.

Unfortunately, a common denominator across all these inventions and traditional DLT applications is a tight coupling and dependency amongst three main components of a DLT project—(i) Policy; Governing policies to maintain the integrity of a properly functioning DLT/Blockchain network. (ii) Payload; Data payloads required to initiate and complete any transaction on DLT regardless of the context of a transaction function and (iii) Protocol; Technical contracts and bindings imposed by a specific DLT/Blockchain network to participate and take advantage of the network effect. Ideally, all three components should be decoupled from each other. This tightly-coupled premise works well within a single DLT/Blockchain network. However, solving practical business problems require interoperation of business functionalities across multiple DLTs, non-DLT applications, and Blockchain networks.

BRIEF SUMMARY OF THE INVENTION

The background art does not teach or suggest specific methods and flows for handling risk in transactions through the blockchain. In particular, the background art does not relate to analyzing risk, determining what contractual party bears what risk (and under which circumstances), and then incorporating this determination of risk into a seamless transaction process that is conducted on the blockchain. The background art also does not teach or suggest the use of semantic web technology to support contractual analysis and storage.

The present invention relates to automatic execution of an agreement, preferably a financial agreement, such as a commercial loan agreement or financial derivatives agreements such as Master Agreements, CSA (Credit Support Annex), and other similar agreements. Such agreements would be stored on, and preferably also executed through, a distributed ledger. As used herein, the terms "distributed ledger" or DLT are used interchangeably with blockchain.

Without wishing to be limited by a closed list, the present invention provides a secure system for preventing fraud, by decentralizing trust. For example, two parties may wish to enter a financial agreement, with certain internal and/or external triggers resulting in certain actions. Such triggers may be internal to the parties, such as their overall revenue, availability of collateral and so forth; or they may be external to the parties, such as market conditions or a characterization of the state of another party, not directly participating in the agreement. If a trigger condition occurs, so that a trigger is invoked, the two parties may not know whether the action will occur. For example, they may not be certain that the other party will be able to perform the action.

Escrow agencies and Custodians exist to hold collateral to help prevent such a problem. Nonetheless, in the case of a crisis involving at least one of the parties, or a general financial crisis, it may not be possible for even such a escrow holder to support execution of the action.

By contrast, the present invention, in at least some embodiments, provides a semantic smart contract which provides secure and certain execution of the action. Smart contracts cannot be hacked or altered through fraud. Their transparency and security is provided through execution on the blockchain. The semantic smart contract, described herein, combines the safety and security of the blockchain smart contract, with semantic analysis and understanding as supported through an analysis engine. The analysis engine may for example execute one or more machine learning algorithms, as described herein, to provide a high level of understanding that supports the automatic execution of the smart contract. In addition, the analysis engine may also analyze the parameters of the contract, decompose these parameters into triggers with associated actions, and then create the semantic smart contract. The semantic smart contract could optionally execute independently of the analysis engine, or upon receiving an interpretation of the input data which would enable the semantic smart contract to match the input data to one or more triggers, and hence to execute one or more actions.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 1A to 1D show overall exemplary systems and methods for implementing the present invention, according to at least some embodiments thereof;

FIG. 1E relates to an exemplary knowledge graph visualization for implementing the present invention, according to at least some embodiments thereof;

FIG. 3 shows a non-limiting exemplary AI engine in detail;

FIG. 4 shows a non-limiting exemplary overall system in detail with party A and party B communicating through a blockchain or distributed ledger on which there is a semantic smart contract;

FIGS. 5A and 5B show non-limiting exemplary AI systems;

FIG. 6A relates to a non-limiting exemplary flow, while FIG. 6B relates to a non-limiting exemplary AI data sources input flow;

FIG. 7 relates to non-limiting exemplary training details for the AI engine, in a flow;

FIG. 9 relates to a non-limiting exemplary flow for CSA rationalization; and

FIG. 10 relates to a non-limiting exemplary flow for a loan.

DESCRIPTION OF AT LEAST SOME EMBODIMENTS

Figure 1A:
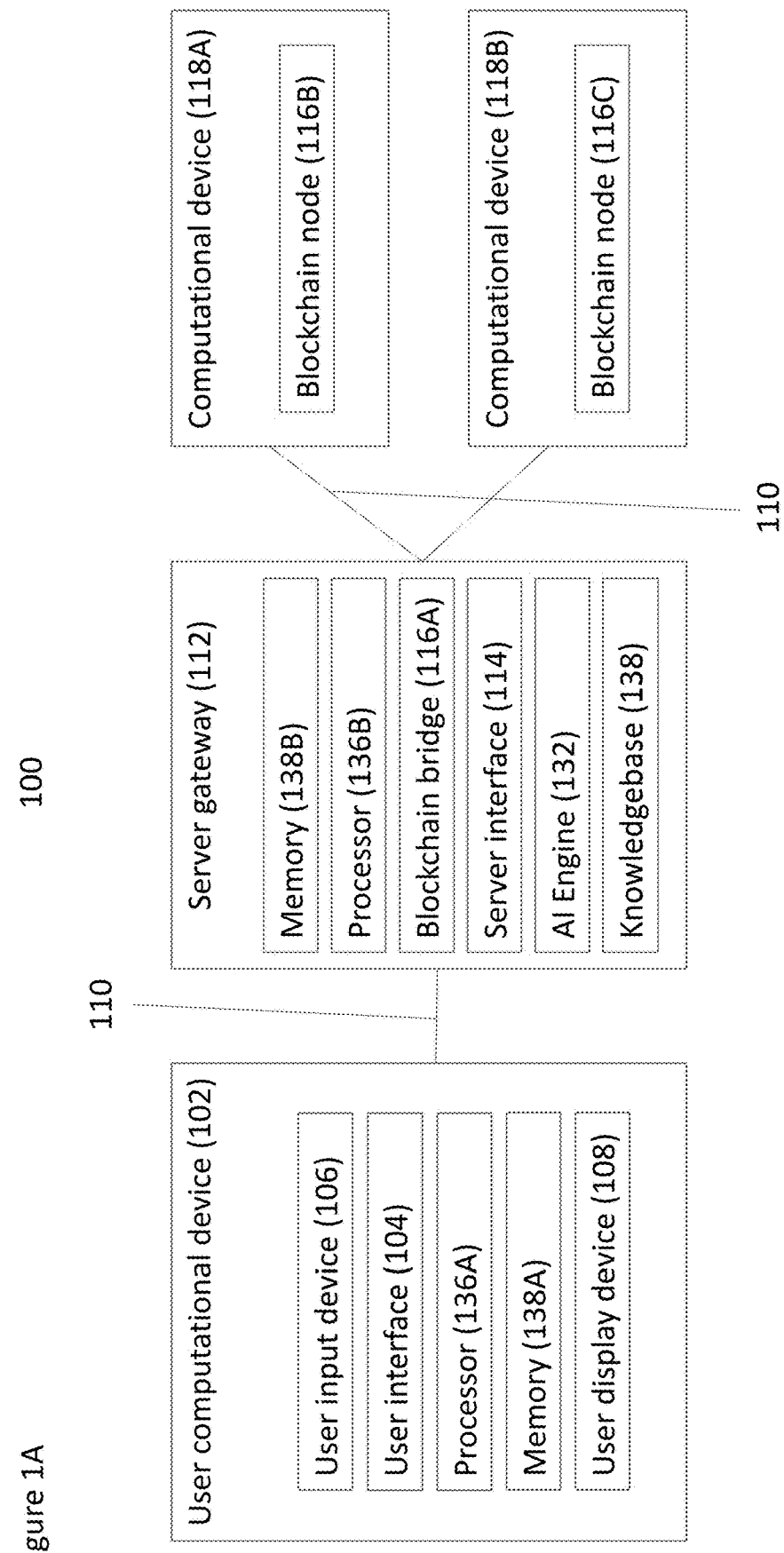

The present invention, in at least some embodiments, is of a system and method for transformation and rationalization of financial derivatives agreements such as Master Agreements, CSA (Credit Support Annex) and other related contracts and documents into a knowledge graph, through the application of automation tools, for subsequent recording of such knowledge graph on a distributed ledger or blockchain network and facilitating risk management operations such as collateral and liquidity management. Non-limiting examples of such automation tools include semantic web, natural language processing, machine learning, and other automation tools.

In at least some embodiments, the present invention provides a system for managing risk management contracts for derivatives. Preferably the system manages associated data, including but not limited to market data (foreign-exchange rates, interest rates, publicly traded financial securities and their prices etc.), and derivatives trading contracts and trade valuations in capital markets to create harmonization of data required for derivatives risk management. Further, preferably efficiencies are obtained by rationalization of contractual covenants, including but not limited to legal definitions, associated entities, facts, rules, and calculations used for risk management processes. Such rationalization is preferably performed for output to a suitable semantic format, such as for example a First-Order Logic Semantic graph format. Such rationalization is also preferably performed for facilitation of interoperation of risk management process between non-DLT and DLT systems.

Derivatives risk management processes include but are not limited to margin workflow management, agreement analytics, margin portfolio optimization, collateral management, and liquidity management across both centrally cleared counterparty (CCP) and bilateral derivatives market environments. The system preferably provides analytics and insights on historical performance of financial derivatives contracts to identify potential contractual term optimizations. Armed with this information, parties in the contract can then agree to revise the contract, and the results of the optimized contract can then be analyzed, until an agreed contract has been reached.

The present invention, in at least some embodiments, combines the powers of semantic web technology and blockchain in a complimentary fashion. The creation of a semantic representation of a legal contract on a blockchain is referred to as 'Semantic Smart Contract'. The semantic smart contract may be represented, for example, according to the RDF (Resource Description Framework) and OWL (Web Ontology Language) formats. The RDF format provides a model for data exchange on the web, using URIs (Uniform Resource Identifiers) to both link two data items and name their connection. The result is a directed labeled graph, which may include both structured and semi-structured data. OWL is a semantic web language which enables various types of information and data to be connected in a semantic web. OWL is particularly useful for describing data connections in a way that is suitable for computational logic, so that the data connections are directly accessible and usable by computer programs.

Such contracts are preferably represented as triples, although other structures are possible and are encompassed within the present invention—(1) Legal Prose; legal obligations/operational obligations; whether the contract needs to rely on LIBOR, federal rate, USD, other currencies and such similar terms and conditions (2) Transaction Parameters; market and idiosyncratic conditions play a part as triggers or events to trigger legal obligations and (3) Inference Code; decision making logic (rules and calculations, if x and y happens, only one inference or calculate z as a function of x and y). Triggers may be of any suitable type but lead to a finite set of consequences—margin call, asset substitution etc. The consequences are preferably executed through actions occurring on the blockchain. The data is used with the market conditions to understand who is exposed to whom, among the contractual parties, and what actions needs to be taken to mitigate the risk of financial losses due to such exposures.

The present invention, in at least some embodiments, seeks to not only rationalize financial derivatives contracts in capital markets, but to do so in an intentional way to speed up processing times on distributed ledger technology, to leverage the existing systems of the contract's parties, and to provide a means for understanding the performance of historical and current contracts so that they can be optimized and re-assessed. By embedding the legal prose that governs the contractual covenants, dependent market conditions and trigger specific risk mitigation actions, and finally the inferencing logic to identify conditions and trigger actions as part of the Semantic Block, the typical chain-code logic that needs to be built specific to any blockchain network is significantly reduced. In technical terms, "chain-code" is typically construed as "smart contract". This logic is built using a blockchain specific coding language, such as for example, Go language on Hyperledger, Solidity language on Ethereum etc. By embedding this code as "Inference Code" into Semantic Smart Contract, it is possible to remove the dependency on the underlying DLT protocol and related language constraints but also reduce the number of lines of code that needs to be executed to a dramatic low level.

Therefore, for at least these embodiments, the system not only makes efficient the ongoing processing of a particular contract; it also empowers parties to optimize contracts to maximize savings value.

As implemented herein, the system preferably leads to a deeper understanding of risk by all contractual parties, including the explicit actions of any non-contractual parties to the contract. By storing this information on the blockchain, it is immutable, selectively transparent, and secure.

The present invention, in at least some embodiments, provides a financial derivatives contract/agreement management, collateral management, and liquidity management platform by leveraging semantic web, AI, and distributed ledger technologies. The platform optionally offers the following functional modules—1) financial derivatives agreement management—consumption of already executed agreements from non-DLT platforms, semantic digitization and rationalization of such agreements into semantic smart contract, negotiation of new agreements on a distributed ledger to create a semantic smart contract, reconciliation of multiple versions of executed and interpreted agreements into a single semantic smart contract, and agreement analytics 2) derivatives data harmonization—harmonization of contractual data with all peripheral market data such as security definition, prices, foreign exchange rates, interest rates etc., 3) margin management—counterparty exposure calculation, margin management workflows including margin call generation and automatic endorsement, approval and finalization, 4) collateral optimization and asset inventory rebalancing—optimization of several hundreds to thousands of assets for a specific margin exposure condition and rebalancing the assets held vs delivered to trading counterparties, and 5) semantic blockchain bridge—to abstract out the underlying distributed ledger protocol details into a semantic representation and seamlessly support reading data from, and writing data to, any distributed ledger. The bridge also preferably supports translating specific terminologies and protocol details between different DLT networks and non-DLT networks, and potentially facilitating the start of a transaction on one network and closure on a different network.

The present invention, in at least some embodiments, supports financial derivatives agreement rationalization. Financial derivatives agreements are a complex set of bespoke contracts that not only captures the legal definitions and implications of a derivative trading relationship, but also captures complete details of a day-to-day operational considerations and obligations. Optionally, the system and method of the present invention allows extension of industry standards such as HBO (Financial Industry Business Ontology) and ISDA CDM (International Swaps and Derivatives Association Common Domain Model) concepts on ISDA Agreements and extract relevant information to create a completely digitized and rationalized contracts, as semantic contracts.

Collateral Management operation requires various types of data from both internal and external sources such as derivatives contracts, market data, valuation data, collateral holdings, asset inventories etc. As described in greater detail below, preferably the present invention harmonizes data from these various sources into a linked graph that makes any further analytics, calculations and workflows a seamless effort.

Exposure calculation and margin workflows are also preferably supported. Derivatives collateral management practice is a very intensive operational effort on a daily basis. Regulations reshaping the global markets are not making these operations any easier. The present invention brings together the data model around derivatives agreements and event models on underlying products to completely automate the exposure calculations and margin workflows.

Collateral optimization and inventory rebalancing are also preferably supported, to enable accurate measuring and controlling the cost of collateral. The present invention preferably employs semantic web and AI to accurately measure cost of collateral and manage/control the balance sheet liquidity risk.

According to at least some embodiments the distributed ledger is optionally a public or permission-less blockchain, such as Bitcoin or Ethereum, which is decentralized and which is a blockchain that anyone in the world can read, anyone in the world can send transactions to and expect to see them included if they are valid, and anyone in the world can participate in the consensus process for determining what blocks get added to the chain and what the current state is. As a substitute for centralized or quasi-centralized trust, public or permission-less blockchains are secured by cryptoeconomics—the combination of economic incentives and cryptographic verification using mechanisms such as proof of work or proof of stake, following a general principle that the degree to which someone can have an influence in the consensus process is proportional to the quantity of economic resources that they can bring to bear.

Alternatively and optionally, the blockchain is a consortium blockchain, such as Hyperledger Fabric or R3 Corda, where the consensus process is controlled by a pre-selected set of nodes, which for example may optionally be financial institutions. Such a blockchain is partially decentralized.

If the blockchain is private or permissioned—that is, centrally controlled by an operating entity to authorize participation—then optionally all members of the system as described by the present invention which need access are provided with cryptographic access and become members of the private or permissioned blockchain system, such as Hyperledger or R3 Corda.

Hyperledger has its own set of protocols and consensus process, which may optionally be used with smart contracts, to prevent fraud. Similar protocol and consensus process exists in other ledger implementations such as R3 Corda.

One of ordinary skill in the art could easily select a distributed ledger and implement it within various embodiments of the present invention, for example according to information provided in "Blockchain Basics: Introduction To Business Ledgers" by Brakeville and Perepa, IBM, May 9, 2016.

A blockchain is a distributed database that maintains a list of data records, the security of which is enhanced by the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One well-known application of a blockchain is the public ledger of transactions for cryptocurrencies such as used in bitcoin; however other applications include real estate, property transfer and non-cryptocurrency financial transactions. The data records recorded in the blockchain are enforced cryptographically and stored on the nodes of the blockchain.

A blockchain provides numerous advantages over traditional databases. A large number of nodes of a blockchain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the blockchain that creates a transaction can determine within a level of certainty whether the transaction can take place and become final by confirming that no conflicting transactions (i.e., the same currency unit has not already been spent) confirmed by the blockchain elsewhere.

The blockchain typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business, for example, when someone sends cryptocurrency to another person, and blocks are created by users known as "miners" who use specialized software/equipment to create blocks. Users of the blockchain create transactions that are passed around to various nodes of the blockchain. A "valid" transaction is one that can be validated based on a set of rules that are defined by the particular system implementing the blockchain. For example, in the case of cryptocurrencies, a valid transaction is one that is digitally signed, spent from a valid digital wallet and, in some cases, that meets other criteria. In some blockchain systems, miners are incentivized to create blocks by a rewards structure that offers a pre-defined per-block reward and/or fees offered within the transactions validated themselves. Thus, when a miner successfully validates a transaction on the blockchain, the miner may receive rewards and/or fees as an incentive to continue creating new blocks.

Preferably the blockchain(s) that is/are implemented are capable of running code, to facilitate the use of smart contracts. Smart contracts are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contracts may also be described as pre-written logic (computer code), stored and replicated on a distributed storage platform (e.g., a blockchain), executed/run by a network of computers (which may be the same ones running the blockchain), which can result in ledger updates (cryptocurrency payments, etc.).

Smart contract infrastructure can be implemented by replicated asset registries and contract execution using cryptographic hash chains and *Byzantine* fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

Not all blockchains can execute all types of smart contracts. For example, Bitcoin cannot currently execute smart contracts. Sidechains, i.e. blockchains connected to Bitcoin's main blockchain could enable smart contract functionality: by having different blockchains running in parallel to Bitcoin, with an ability to jump value between Bitcoin's main chain and the side chains, side chains could be used to execute logic. Smart contracts that are supported by sidechains are contemplated as being included within the blockchain enabled smart contracts that are described below.

For all of these examples, security for the blockchain may optionally and preferably be provided through cryptography, such as public/private key, hash function or digital signature, as is known in the art.

In addition, various types of machine learning and artificial intelligence (AI) algorithms may be implemented for the present invention. Certain non-limiting examples are given below but it is understood that the present invention is not limited to these examples.

Turning now to the drawings, FIGS. 1A to 1D show overall exemplary systems and methods for implementing the present invention, according to at least some embodiments thereof. Turning now to FIG. 1A, there shown an exemplary system 100, featuring a user computational device 102, in communication with a server gateway 112 through a computer network 110 such as the internet for example. Server gateway 112 is in turn in communication with a computational device 118A and a computational device 118B. Each of user computational device 102, server gateway 112 and computational device 118A/118B may optionally comprise one or more of a desktop computer, laptop, PC, mobile device, cellular telephone, and the like. Server gateway 112 may also comprise a virtual server, a plurality of servers or be implemented as a plurality of microservices User computational device 102 preferably comprises a user input device 106 which may for example be a mouse, keyboard, other pointing device, touchscreen and the like. User input device 106 receives input from the user. The user also preferably can review information and may also be able to implement commands through user interface 104 which is preferably displayed by user display device 108.

As used herein, a "user interface" 104 generally includes a plurality of interface devices and/or software that allow a user to input commands and data to direct the processing device to execute instructions. For example, the user interface may include a graphical user interface (GUI) or an interface to input computer-executable instructions that direct the processor to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other input/output device for communicating with one or more users or participants in the financial contract.

A processor 136A performs instructions for operating user computational device including with regard to the user interface 104. Such instructions are stored in the memory 138A. A parallel processor 136B performs instructions for operating server gateway 112, with instructions being stored in memory 138B. As used herein, a processor generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

User computational device 102 is in communication with server gateway 112 to exchange information and commands, and also for user computational device 102 to be able to receive results from server gateway 112. Server gateway 112 preferably comprises a memory 138B and a processor 136B which has similar functions to those described at the user computational device 102.

Server gateway 112 also preferably has a blockchain bridge 116A which is in communication with blockchain nodes 116B and 116C. Blockchain bridge 116A enables server gateway 112 to read information from the blockchain nodes 116B and 116C, and to write information to these nodes.

Each such computational device comprises a memory, which is not shown, for storing information regarding the blockchain. In this non-limiting example, blockchain nodes 116B and 116C belong to a single blockchain network, which may be any type of blockchain, as described herein. However, optionally, server gateway 112 may operate with or otherwise be in communication with different blockchains operating according to different protocols, and also optionally through a plurality of blockchain bridges (not shown).

FIG. 1A shows blockchain nodes 116 B and 116C as communicating, but in fact, in operation of the blockchain, each such computational device retains a complete copy of the blockchain. Optionally, if a blockchain were to be divided, then each computational device could perhaps only retain a portion of the blockchain. With the preferred embodiment described herein, each computational device retains a complete copy of the blockchain. The communication lines are simply shown to indicate that all of the blockchain nodes retain a copy of the blockchain, preferably a complete copy of the blockchain rather than to show communication directly between the computational devices. Optionally, however, server gateway 112 does communicate directly with computational devices 118A and 118B through computer network 110.

A server interface 114 preferably communicates with user computational device 102, again to receive commands and instructions from user computational device 102, and to send information and displays back to user computational device 102.

Server gateway 112 also preferably comprises an AI engine 132 and a knowledge base 138. Knowledge base 138 is preferably an RDF/OWL based knowledge graph database which stores information that is then used by AI engine 132 for analysis functions.

For example, in operation the user may choose to either request the use of a contract stored in knowledge base 138 or may send parameters for such a contract to knowledge base 138 through user interface 104. In turn, AI engine 132 analyses the parameters of the contract, whether sent by the user or selected from knowledge base 138 or a combination thereof. AI engine 132 may also read such parameters from blockchain nodes 116B or 116C through blockchain bridge 116A. AI engine 132 preferably then stores the results of such analysis on the blockchain through the blockchain bridge 116A.

Optionally, either of processor 136A or 136B comprises a hardware processor configured to perform a predefined set of basic operations in response to receiving a corresponding basic instruction selected from a predefined native instruction set of codes, that are stored on memory 138A or 138B, respectively. For example, processor 136B may execute instructions stored in memory 138B, in which the latter comprises a first set of machine codes selected from the native instruction set for receiving parameters for a contract, a second set of machine codes selected from the native instruction set for operating the AI engine to analyze the parameters of the contract and a third set of machine codes selected from the native instruction set for interacting with blockchain nodes 116B or 116C. For example, the third set of machine codes may cause the instructions executed by processor 136B to interact with blockchain nodes 116B or 116C, which may in turn cause a smart contract to automatically execute.

As another example, processor 136A may execute instructions stored in memory 138A, in which the latter comprises a first set of machine codes selected from the native instruction set for operating user interface 104, a second set of machine codes selected from the native instruction set for receiving a response from server gateway 112 and a third set of machine codes selected from the native instruction set for optionally performing local analysis.

Figure 1B:
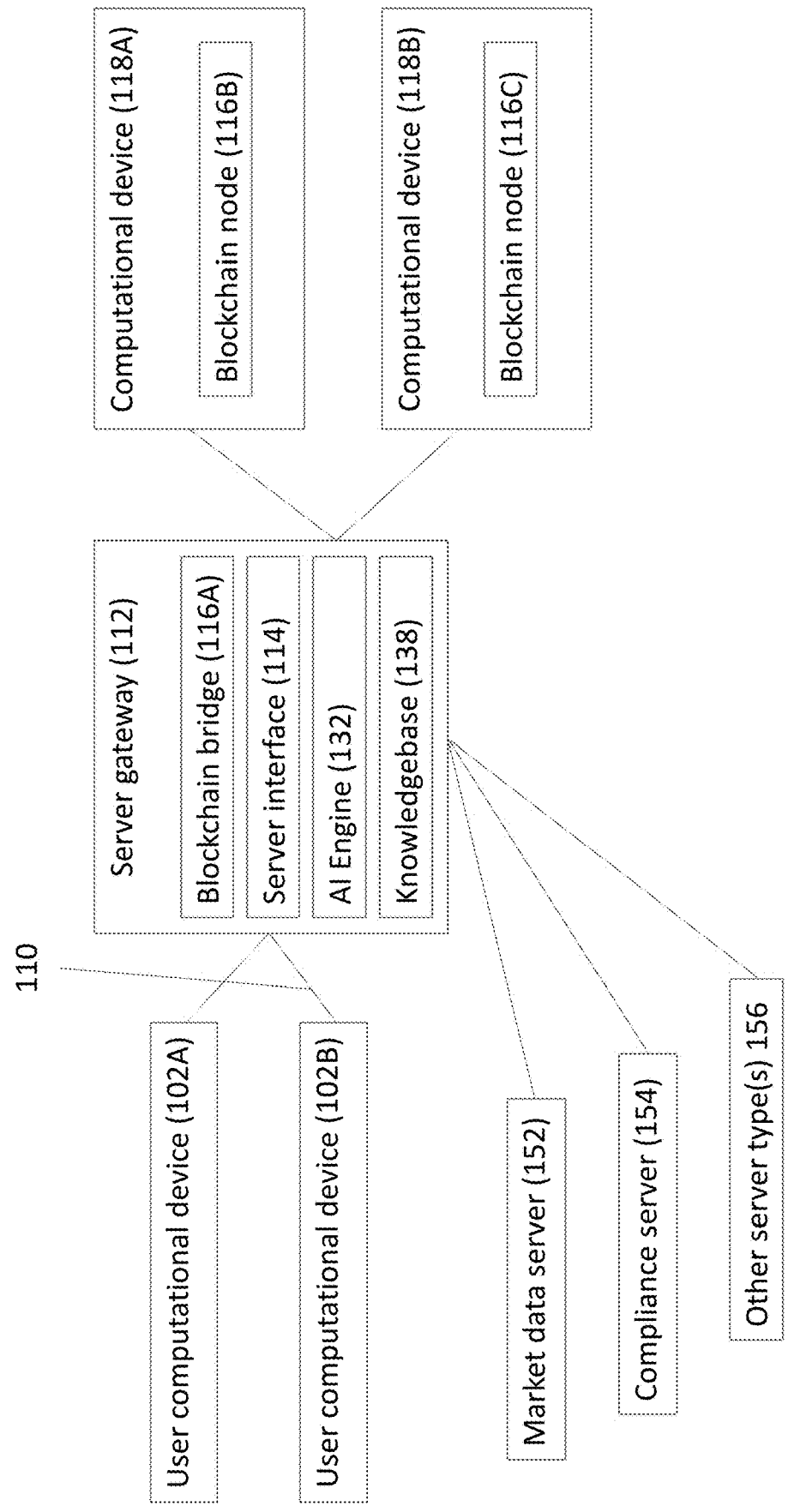

FIG. 1B shows another exemplary system 150. Components with the same numbers as those in FIG. 1A have the same or similar function. In this non-limiting exemplary implementation, user computational devices 102A and 102B are shown in a simpler form. Each is assumed to have the components of user computational device 102 of FIG. 1A.

Server gateway 112 is also shown in this simplified form. It again communicates with the blockchain through a blockchain bridge 116A as previously described. Server gateway 112 also obtains information from various external data services and servers, shown as the market data server 152 and a compliance server 154. Other server types 156 may also optionally supply data.

In this non-limiting example optionally each of user computational device 102A and 102B may communicate through server gateway 112, for example to negotiate the parameters of a contract, to agree to accept a contract, to reject a contract, to determine risk factors associated with a contract, and so forth.

FIG. 1C shows a general exemplary flow for operation with the systems of FIGS. 1A and 1B. As shown in the flow 160, there's a contract input by the user of the system in 162. The user may for example upload an entire contract or contract parameters or desired outcomes for a contract. The system may also upload some information, for example from the previously described knowledge base, either in the form of a complete contract that was previously uploaded, or in the form of parameters to be considered and agreed by the parties. The contract is analyzed by the AI engine 164. The contractual legal definitions are identified in 166.

Next, the operational terms and their values are identified in 168. The operational terms and values can be considered as facts, that needs to be used in risk evaluation logic construction.

Then the market triggers are identified in 170. The market triggers are the triggers which would determine when a payout would be made, or when specific action or actions would need to be taken as specified by the contract. In this non-limiting example, they're identified as market triggers because they're triggering conditions caused by one or more changes in the market, one or more parameters of the market, or one or more actions taken by the market.

Next, calculations and rules are identified in 172. These determine for example the exact nature of the market trigger, how to calculate whether the market trigger has been reached, how to calculate other information associated with the rules for the contract, and so forth.

Next, the initial structure of the 'Semantic Contract' is constructed in 174. After identifying the factors required for risk evaluation and mitigation logic determination from 164 to 172, the Semantic Contract is constructed. Preferably all such factors are considered. Also preferably, the Semantic Contract is constructed by forming a knowledge graph structure of the contract, optionally and more preferably in the RDF/OWL format. When a contract is signed between two parties, one party will typically accept some form of exposure or risk in exchange for money or equivalent financial asset. The level of risk, the type of triggers that may cause that risk, and whether or not the risk is one that is acceptable in terms of the overall risk profile and standards of the party are preferably evaluated in order to help the user determine whether or not the contract should be accepted, or alternatively whether it needs to be changed. Through a graphical visualization of Semantic Contract, understanding of such complex contractual covenants makes negotiation of the contract between counterparties much easier.

The Semantic Contract is negotiated in 176. Optionally, the process may continue from 164 to 174 more than once, as the contract is negotiated in 176. If the parties can agree on a set of terms and the contract is accepted in 178, the contract and its acceptance workflow lineage details are preferably then stored in the blockchain in 180.

Preferably, as the parties start negotiating the contract and its provisions, and this information is recorded as blocks on the distributed ledger, a blockchain is formed.

Figure 1D:
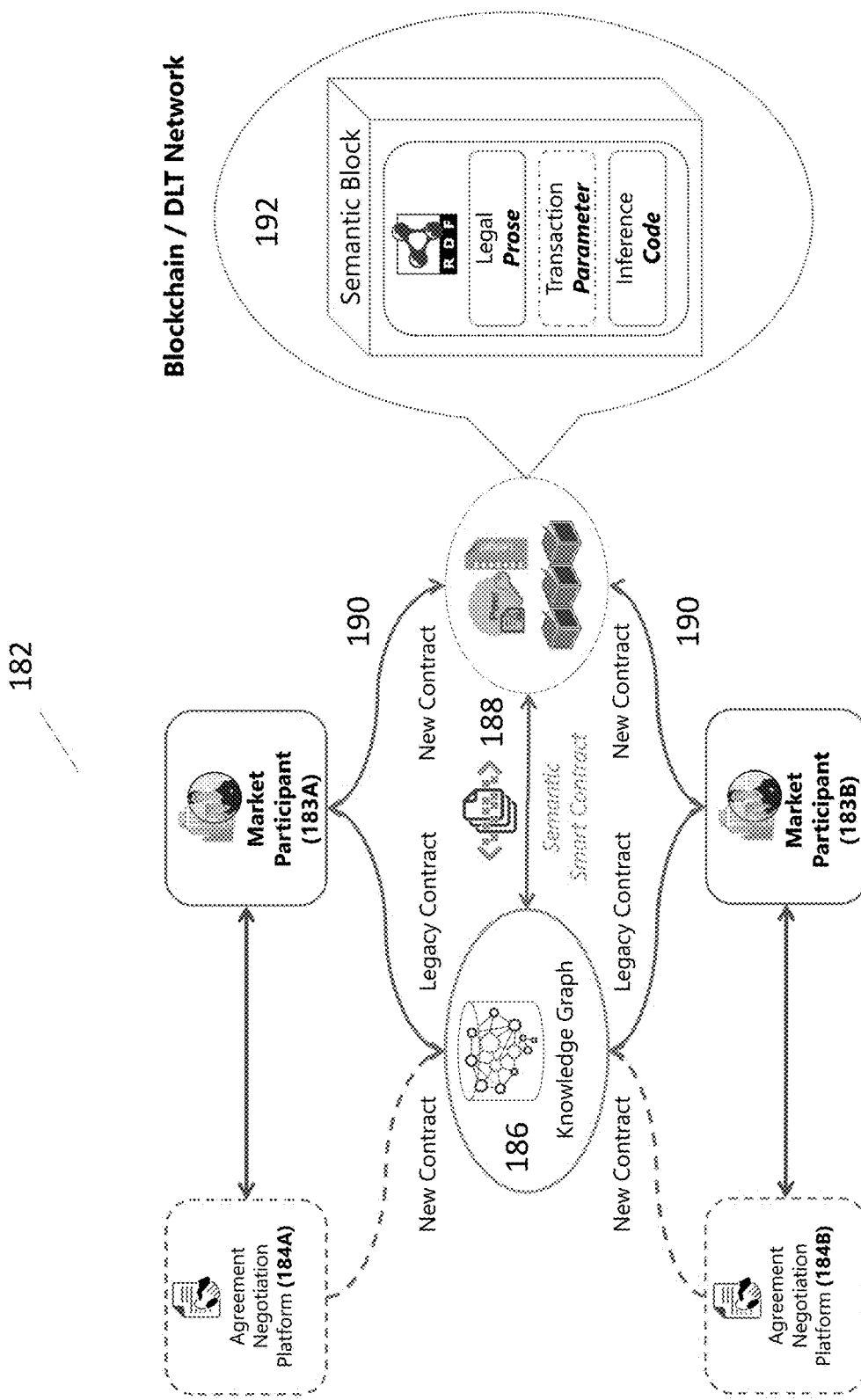

FIG. 1D shows an overall general flow 182 with various components shown in a more general format. An agreement negotiation platform 184, shown in two instantiations as 184A and 184B for the purpose of illustration and without any wish of being limiting, preferably includes various industry initiatives and platforms to facilitate online contract negotiation. These contract negotiation platforms are optionally non-DLT based platforms, although alternatively a DLT based platform could be used. Currently DLT based platforms are not commercially available. Integration options for these non-DLT contract negotiation platforms are varying in nature and technical details, and no standard market practice exists, which is a serious drawback for their use and implementation.

Agreement negotiation platforms 184A and 184B are preferably controlled by or at least are in communication with computational devices of market participants 183, shown respectively as market participants 183A and 183B for the purpose of discussion only and without any intention of being limiting.

The AI based data transformation and rationalization of contracts from agreement negotiation platforms 184 to a Knowledge Graph is highlighted in components 186 and 188. Component 188 includes transformation of 'Semantic Contract' into a 'Semantic Smart Contract' and addition of such legacy and/or new contracts negotiated on agreement negotiation platforms 184 into a DLT structure. Further amendments and negotiations between market participants 183 on Semantic Smart Contract preferably forms the chain of blocks and hence a blockchain is formed as blockchain 192.

Component 190 captures the creation of a Semantic Smart Contract between market participants 183 on a DLT platform. Component 190 provides a simplified representation of the general flow outlined in FIG. 1C. The end result of the contract negotiation process indicated by component 180 in FIG. 1C is detailed in component 192. Component 192 demonstrates a preferred, exemplary implementation of the data format and contents of a Semantic Block; legal prose, transaction parameters, and inference code in RDF format as a 'Semantic Smart Contract'.

FIG. 1E shows a non-limiting exemplary visualization, indicating the presence of the semantic contract in the center with a description of the information given off to the right. Information regarding who is the counter party, the principal, collateral eligibility, products, re-hypothecation, disputes, transfers, and so forth. The exemplary term "re-hypothecation" refers to re-use of a collateralized asset or deployment for a different use while the secured party has access to it in the event of a default by pledgor. For example, as per CSA, for a given business day, the exposed party is identified as "secured party" and counterparty is identified as "pledgor". So, the pledgor collateralizes an eligible asset to the secured party. For the time the secured party has access to the collateralized asset, the secured party can decide to use that asset for a different purpose, even in an entirely unrelated transaction.

This visualization allows the user to see all the information around the contract in a single place. Optionally, this contract is bundled up and is executed as a semantic smart contract in order to permit the contract to be executed automatically or semi-automatically on a distributed ledger.

Figure 2:
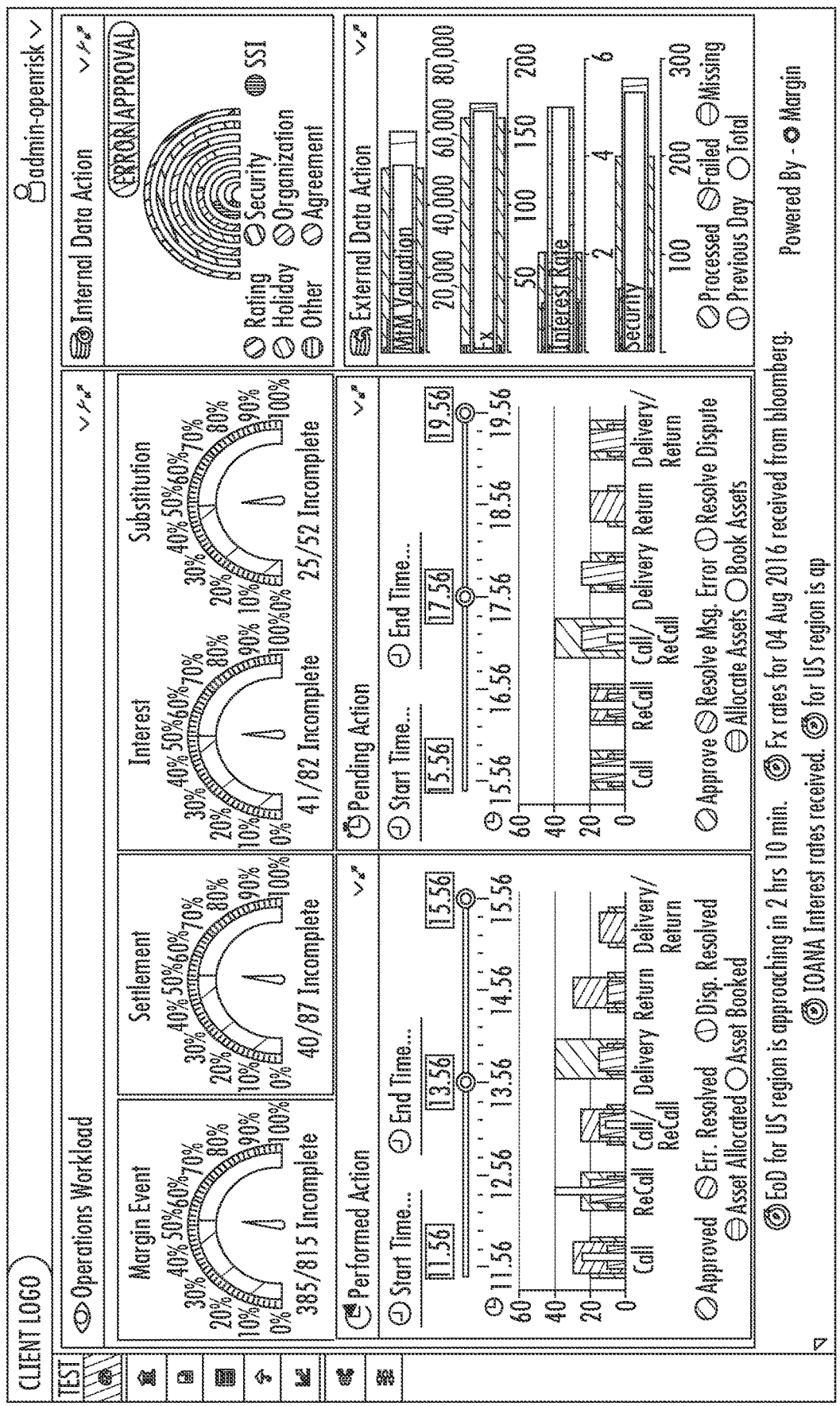
FIGS. 2A and 2B relate to a non-limiting exemplary system for a smart contract, and a method for a smart contract, respectively, according to at least some embodiments of the present invention.
FIG. 2C relates to an exemplary dashboard visualization for operational details relating to such a smart contract.
Figure 2A:
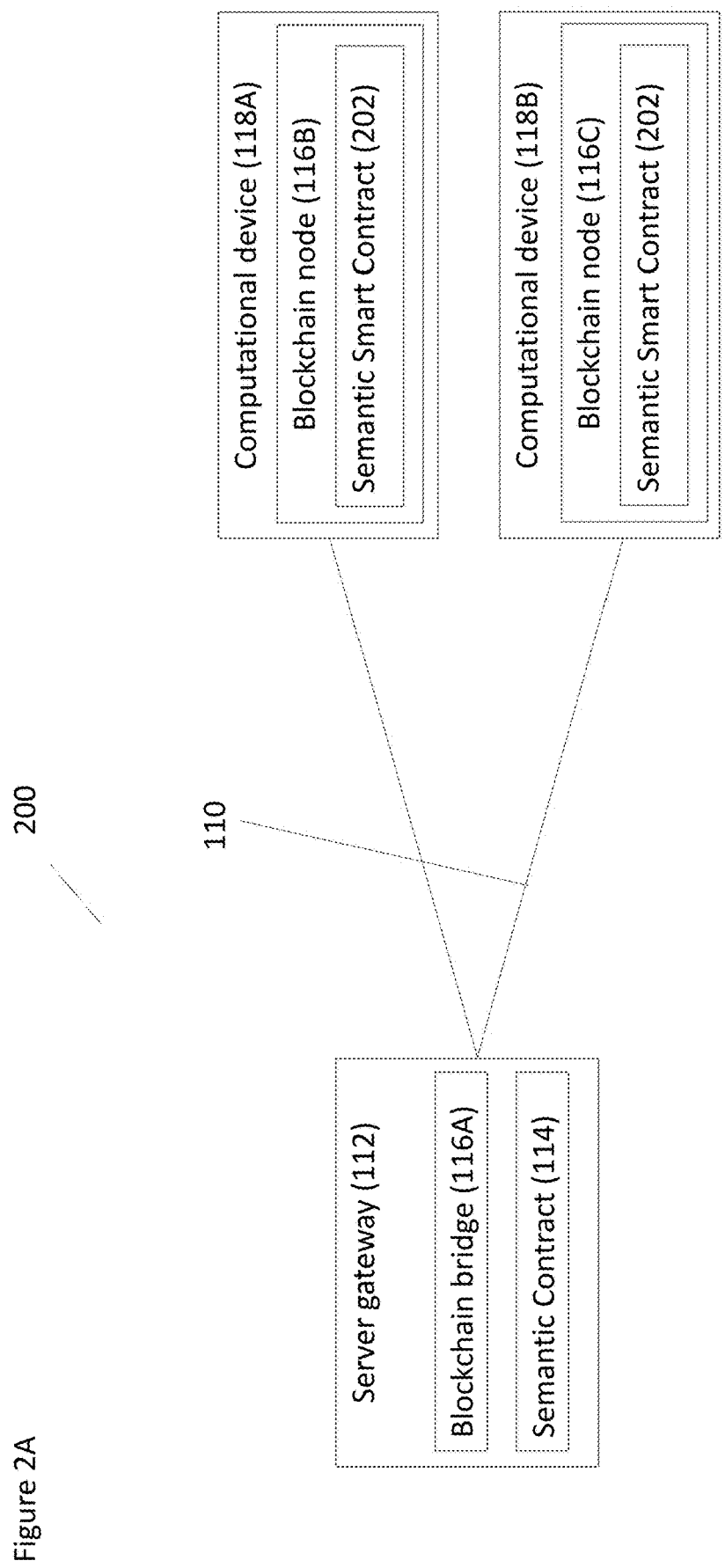

FIGS. 2A and 2B relate to a non-limiting exemplary system for a Semantic Contract transformation into a Semantic Smart Contract and a method for a Semantic Smart Contract execution respectively. Turning now to FIG. 2A, there shown in the system 200, server gateway 112 and blockchain bridge 116A again, with a semantic contract 114.

Server gateway 112 is again in communication with computational devices 118A and 118B, which have each blockchain nodes 116B and 116C. Each node is now shown as having a semantic smart contract 202. This information is preferably used in execution of semantic smart contracts, so that the execution can be communicated to blockchain bridge 116A. Optionally semantic smart contract 202 may retrieve triggers from within the blockchain network under components 118A/118B or via the blockchain bridge 116A. Regardless of the source of trigger data from within the blockchain network or outside the network, as long as the matching trigger conditions are met, the semantic smart contract executes and intended outcomes are produced. It is also to be noted that both blockchain node 116B and 116C have Semantic Smart Contract 202. This is to indicate the fact that the same copy of the Semantic Block is distributed across all relevant and connected nodes on a blockchain network.

FIG. 2B shows a non-limiting exemplary semantic smart contract execution flow. In a flow 250, the transaction parameters identified under the legal prose of a semantic (smart) contract are received, preferably off-ledger, in 252. These transaction parameters are added to the knowledge graph modeled as a semantic graph in 256. Non-limiting exemplary transaction parameters include market data, credit data, portfolio valuation data, portfolio sensitivity data etc. The same or similar information can optionally be received directly on a blockchain network in component 254 through 'data oracles' on a given blockchain network. Regardless of the source of information, the transaction parameters are preferably recorded on a distributed ledger as part of a blockchain network in 258.

In 260, semantic smart contracts that have dependency on the newly available transaction parameter information are preferably identified and matched. Optionally, any other contractual provisions relevant in a particular semantic smart contract context are recorded on the ledger in 262. Next inference code specific to a semantic smart contract is determined in 264. If a triggering condition identified from the newly available transaction parameters are matched with the contractual triggers, then the semantic smart contract executes in 266, and details of such execution is written to the blockchain in 268. The execution may also be written to other servers, for example the previously described server gateway may actually be listening to such executions and may cause other actions to be performed. The execution may cause real world actions to be performed, whether it is notification to another computational device, notification to a user, communication of a margin call, distribution of interest amounts, transfer of assets, pledging of assets, receiving of assets, and/or other actions which may be taken due to the execution of a market related trigger or other types of triggers.

Figure 2C:
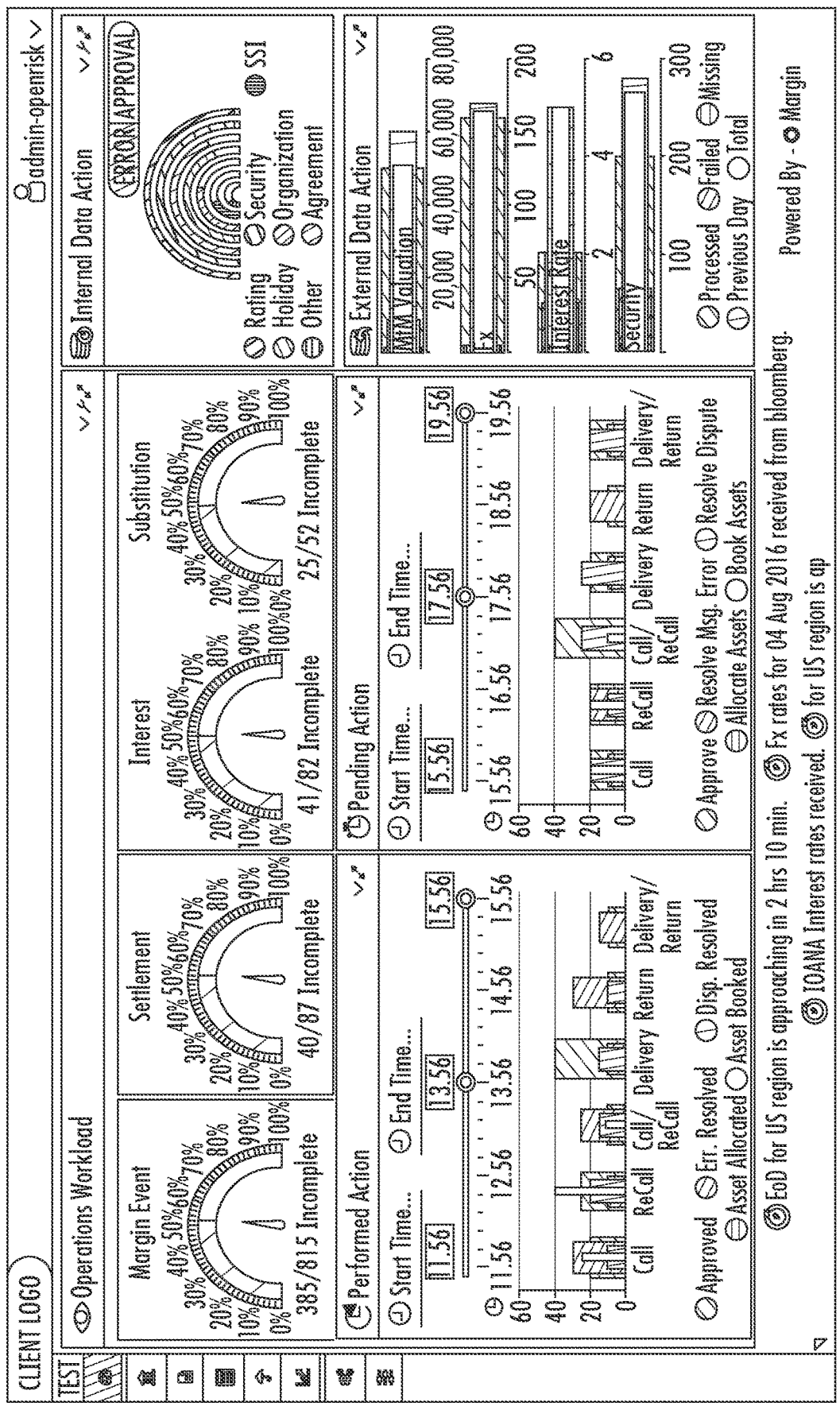

FIG. 2C shows a non-limiting exemplary Operations Dashboard which includes such information as a margin event, settlement, interest, substitution, and other parameters which would be of importance and of use to the user upon execution of a semantic smart contract.

FIG. 3 shows a non-limiting exemplary AI engine in detail. The Artificial Intelligence engines can be broadly divided into a data semantics engine (302) and traditional AI engine (314). The AI engine 132 is shown for example in FIGS. 1A and 1B. In an AI engine 132 there is preferably present a data semantics engine 302. Data Semantics engine 302 preferably contains an ontology-based data model 304, semantic data extraction module 306, semantic data classification module 308, and a data transformation module 310. These allow semantic analyses to be performed holistically driven by a derivatives domain specific ontology data model. Output from the data semantics engine is further stored in a knowledge graph database 312.

Ontology based domain model 304 preferably supports modeling of the derivatives contract according to a semantic web format. As noted previously, non-limiting examples of such formats include RDF and OWL, which may also be used together. Also, as noted previously, RDF enables two resources to be connected in a triple, as <subject><predicate><object> (see for example https://www.w3.org/TR/2004/REC-rdf-primer-20040210/). <subject> is the subject resource, <object> is the object resource and <predicate> describes their relationship. Each <subject> and <object> may be connected to multiple other <objects> and <subjects> respectively. Furthermore, a resource can be a subject for one relationship and an object for another one. The set of connections forms a graph. For a contract as described herein, the provisions may be connected according to such triples. For example and without limitation, Party A may enter into a contract to provide collateral to Party B due to a trigger, such as a market condition. An exemplary contract provision may have Party B as the subject, Party A as the object and the predicate would be the provision of collateral due to a trigger. Such provisions may be broken down hierarchically, until a base level is reached, for example to determine the type of collateral and details about the market condition or other trigger.

The computational logic of OWL includes primitives, termed entities, which are the base level of the logic (see for example https://www.w3.org/TR/owl2-syntax/ for a description of the logic). Entities include classes of objects and basic relationships built upon these objects. Expressions provide another layer of detail about these classes. Axioms are logic statements that are true within a particular implementation of the logic, such as for example by relating particular subclasses as belonging to a larger class. For example, the sub-class "bank headquartered in Europe" could belong to the larger class "bank".

Furthermore, OWL provides computational logic that is compatible with execution of program instructions and which may be built on top of the RDF semantic structure. The OWL logic may be mapped onto RDF graphs, as described for example in: https://www.w3.org/TR/2012/REC-owl2-mapping-to-rdf-20121211/. Briefly, axioms of the OWL logic are mapped onto the graph provided by the RDF format, to determine how execution of the logic should be performed. As a non-limiting example, the designation of a party as providing or receiving collateral, and under which trigger(s) such as which market condition(s), would be described according to the contract in an RDF graph. The OWL logic could then be executed over the graph, so that the correct party provides or receives collateral as each trigger condition(s) are fulfilled. More complex first-order-logic that can't be modeled as an OWL Axiom can be fulfilled using inferencing/reasoning logic languages such as SPIN (SPARQL Inferencing Notation). SPARQL (Simple Protocol And RDF Query Language) is a query language published by W3C standards body to create, update, delete, and query RDF data structures.

Semantic Data Extraction module 306 brings together the ontology model in 304 and the actual contractual data being processed. An instance of the logic segments of a contract are extracted and matched to the domain specific entities and relationships defined in ontology model. Then the Semantic Classification module 308 further identifies and classifies the extracted data into legal definitions, contractual facts, rules, and calculation segments. These classification and segmentation form the basis for the 'Legal Prose', 'Transaction Parameters', and 'Inference Code' pillars of the semantic smart contract.

Data extracted by Semantic Data Extraction module 306, according to the domain model defined in data semantics engine 302. The data is semantically classified in semantic data classification module 308. Next the data is preferably transformed to a concrete RDF/OWL formats by data transformation module 310 and stored in a knowledge graph database 312.

Information from knowledge graph database 312 is then preferably fed to an AI engine 314 which includes a Natural Language Processing Engine 316 and a Machine Learning Engine 318. Data classified and transformed in Data semantics engine 302 is further split into characters, words, and sentences for natural language processing by Natural Language Processing (NLP) Engine 316. Relationships that exist across different segments of a contract and across multiple related contracts are also preferably processed in NLP 316.

Optionally, to support the NLP engine 316, a sequence of Machine Learning models are applied as Machine Learning Engine 318. Where applicable, machine learning models incorporate the supervised learning techniques to learn from previously available data. Where a sufficient learning data set is not available, an unsupervised learning model in conjunction with the domain knowledge modeled in ontology based data model 304 is used for accurate learning and processing of data. This will help determine for example the amount of risk, what type of collateral is needed, how it affects the liquidity position of a particular party, how liquid the collateral needs to be, and other information. The information may preferably relate to parameters, details, and other types of data stored in the knowledge graph database 312.

The RDF graph and also optionally the OWL logic are preferably stored in the blockchain for a semantic smart contract, as the various components lend themselves to storage and execution through blockchain enabled smart contracts.

FIG. 4 shows a non-limiting exemplary overall system in detail with party A and party B communicating through a blockchain or distributed ledger on which there is a semantic smart contract. The AI in semantic web based classification of contractual covenants is performed, and is fed into the knowledge graph, optionally through the analysis of legal contracts. The market data trade positions, asset inventory, market utilities, and other third party information is also preferably fed into the knowledge graph in the AI engine, along with collateral and liquidity management. This information together may then be written back to the blockchain.

As the parties communicate, preferably for negotiation, communication may optionally occur through the blockchain, or may only be written to the blockchain after negotiation has finished.

FIG. 5A shows a non-limiting exemplary AI system. As shown in the system 500, contract text inputs 502 are analyzed through a tokenizer 518. This information is then fed as inputs 510 to an AI engine 506, which in this non-limiting example includes a DBN (deep belief neural network) 508. A DBN is a type of neural network composed of multiple layers of latent variables ("hidden units"), with connections between the layers but not between units within each layer. The neural network 514 then receives the inputs 510 and provides outputs 512. In this case the outputs include contract provisional analyses 504.

In FIG. 5B, another non-limiting exemplary AI system is shown. In AI system 550, components which have the same number as those in FIG. 5A have the same or similar function. In this non-limiting exemplary case, the neural model itself has been changed in AI engine 506. A CNN (convolutional neural network) 558 is present, again with inputs 510 and outputs 512. It includes convolutional layers 564 and a neural network 562. Information is then optionally and preferably output in terms of contract provision analysis in 504, as previously described.

A CNN is a type of neural network that features additional separate convolutional layers for feature extraction, in addition to the neural network layers for classification/identification. Overall, the layers are organized in 3 dimensions: width, height and depth. Further, the neurons in one layer do not connect to all the neurons in the next layer but only to a small region of it. Lastly, the final output will be reduced to a single vector of probability scores, organized along the depth dimension. It is often used for audio and image data analysis, but has recently been also used for natural language processing (NLP; see for example Yin et al, Comparative Study of CNN and RNN for Natural Language Processing, arXiv:1702.01923v1 [cs.CL] 7 Feb. 2017).

FIG. 6A relates to a non-limiting exemplary flow, while FIG. 6B relates to a non-limiting exemplary AI data sources input flow. Turning now to FIG. 6A there is shown in the flow 600 that contract inputs are first received in 602. The text is tokenized in 604, and inputs are fed into the engine in 606. The engine processes the inputs in 608, and then it determines contract triggers in 610. It also determines the contract details in 612, which for example could include the qualifications for the triggers, qualifications for the collateral, the types of actions to be taken, the type of remuneration to be provided for taking on the risk by one party, and so forth. The collateral details are then determined in 604, followed by the risk profile in 616. The risk profile 616 is typically influenced by current market conditions but is also influenced by the triggers which would typically be market triggers or would include market triggers, and also by collateral details. In addition, the risk profile would also relate to the amount of risk likely to be taken on by one party, whether or not the party can rely on the counterparty and to the contract to perform their side of the obligations, and also such factors as the level of collateral held by the party which would need to provide it, the liquidity of that collateral, and so forth.

The contract requirements are determined in 618 which would include the collateral, the contract triggers, the details and other information which would occur, and the requirements which may be needed for one party to upkeep as well as for the other party to perform.

Next, output triggers are requirements, collateral, and risk are given in 620 by the AI engine.

FIG. 6B relates to a non-limiting exemplary AI data sources input flow. In a flow 600, unstructured data is transformed to structured data in 602. The structured data's input in 604 and is pre-processed in 606. The inputs are fed into the AI engines in 608.

Next, there's a semantic correlation with the data model in 610. Client specific terminology analysis and mapping is performed in 612. For example, client may have particular terms that they wish to apply, or particular meanings for particular terms, or particular caveats for particular terms, which should be included. Unknown terms are provided for further analysis in 614, whether through an AI engine or whether through human analysis. Semantic rules are applied in 616, and the information is deposited in 618, for example on the blockchain or another depository, and the contract is sent for approval in 620.

FIG. 7 relates to non-limiting exemplary training details. In a training flow 700, first the training data is received in 702. Training data may optionally be obtained by having access to several market participants' derivatives contract portfolio. However, such contracts and their terms are tailored for their specific legal and operational practices and focused on specific type of counterparty they trade with. However, a guideline for every type of derivative risk management contract is published periodically by ISDA (International Swaps and Derivatives Association). For example, such guiding documents are available from 2001 through 2018 from ISDA website.

Next, the training data is processed through the convolutional layer in 704, and then through the connected layer in 706. It is adjusted through the gradient in 708, and then the final weights are determined in 710. Optionally, the processing occurs multiple times with multiple rounds with training data before the final weights are determined in 710.

Figure 8:
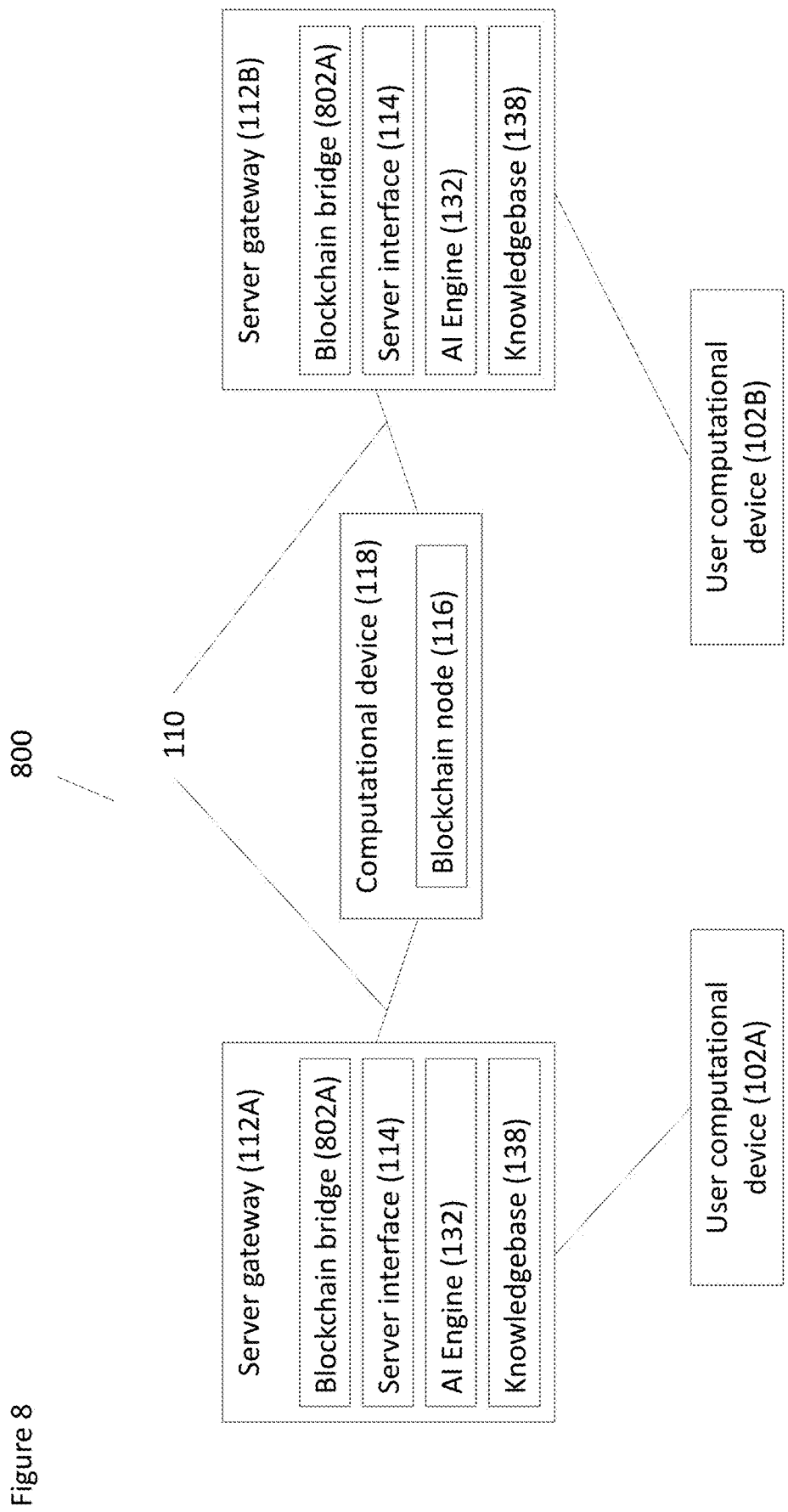
FIG. 8 relates to a non-limiting exemplary system which features multiple blockchain bridges.

FIG. 8 relates to a non-limiting exemplary system which features multiple blockchain bridges. Components with the same numbers as those in FIGS. 1A and 1B have the same or similar function. In this non-limiting example, in a system 800, there is a blockchain bridge 802A and a blockchain bridge 802B. Each of these may connect to different blockchain networks or to the same blockchain network. In this unlimiting example a single blockchain node 116 is shown, although optionally and typically there would be multiple blockchain nodes, as in fact that is what makes the chain, and is operated by computational device 118.

Each of user computational devices 102A and 102B connect to a different server gateway with a different blockchain bridge. Server gateways are preferably implemented as server gateways 112A and 112B, but otherwise have the same or similar functions to those server gateways 112 described in FIGS. 1A and 1B.

As a non-limiting example, although not shown here, the blockchain bridge for each server may be connected to different blockchains and may actually therefore be possible to write the data across multiple blockchains, or read data from multiple blockchains, or both, or alternatively each user computational device may use a different blockchain bridge for various reasons, for example with regard to user functionality or other information that different blockchain bridges would provide.

FIG. 9 relates to a non-limiting exemplary blockchain margin workflow. As shown in the flow 900, party A computes total exposure in 902, and then party A proposes an exposure transaction to party B in 904. Party B computes its total exposure in 906 and proposes an exposure transaction to Party A in 908, which may be the same or different to that proposed by party A. Optionally 902-908 are repeated more than once until the semantic smart contract is executed and exposures details are agreed according to the set thresholds. The semantic smart contract governing the relationship between Party A and Party B is executed to reconcile exposures from both sides and adherence to the CSA terms and conditions in 910. In a scenario where exposures proposed by Party A and Party B do not reconcile or do not adhere to the CSA terms and conditions, factors contributing to the dispute are distributed to both parties for further resolution actions in 912. The nature of the resolution could optionally be subjective and is preferably left to the contractual parties to resolve, optionally outside the blockchain network. Otherwise, upon successful reconciliation of calculated exposures and adherence to the CSA terms and conditions as verified by the Semantic Smart Contract, Pledgor and Secured Party to the margin transaction are identified in 914.

Secured Party to the margin transaction communicates a margin call to the Pledgor of the margin transaction automatically and due to the pre-qualified nature of the semantic smart contract execution, the margin calls are endorsed by both parties preferably automatically in 916. In 918, the Pledgor proposes collateral asset to the Secured Party and Semantic Smart Contract is executed again to make sure the proposed assets are identified as eligible collateral assets as part of the CSA terms. Due to the pre-qualified nature of a smart contract execution, the eligible collateral assets are preferably automatically endorsed by both parties and accepted by the Secured Party. Settlement Instructions for the logical closure of the margin transaction are issued to both Pledgor and Secured Party in 920. Physical transfer of the collateral assets is preferably conducted through a custodial representation outside the blockchain network.

FIG. 10 relates to a non-limiting exemplary flow for a loan. As shown in a flow 1000, at 1002 a lender recognizes a material event. The lender then posts this event to the borrower at 1004. In a separate but parallel process, a borrower recognizes a material event at 1006, and then posts this event to the lender at 1008. The material event for the borrower may for example be a milestone reached by the borrower.

At 1010, a semantic smart contract is executed to reconcile event details according to loan agreement terms and conditions. Preferably, the details supplied by the lender or the borrower are written directly to the blockchain for provision to the semantic smart contract, so that the smart contract preferably executes automatically.

Optionally, to support further decision making by the borrower and/or the lender, optionally at 1012, dispute factors are distributed to both parties for further resolution. For example, the material event information may be provided by a source that has been previously agreed by both parties to be a trusted data source. However, the process at 1012 optionally allows the automatic execution, even based on the trusted data source, to be held, pending further negotiations.

At 1014, in a process which may run in parallel or sequentially to that of 1012, the specific event result and funding action is identified, according to the reporting of the material event by the borrower and/or the lender. The specific result and funding action may be identified automatically through the smart contract for example.

At 1016, a funding notice is issued from Borrower to Lender and endorsed automatically. A funding notice is a communication or event (from Borrower to Lender) such as principal pre-payment or payment notices, interest payment notices or principal drawdowns. If there are specific terms governing such notices in the contract, the event is automatically endorsed and the smart contract is executed to trigger the execution of required actions, as outlined in the governing contract.

Next at 1018, the Borrower and Lender both receive specific funding instructions, optionally including the automatic execution of fund transfer through a smart contract.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for analyzing a financial derivatives contract, comprising a user computational device, a server gateway and one of a distributed ledger network or blockchain network, wherein said network connects said user computational device and said server gateway, wherein said server gateway comprises an analysis engine, wherein said analysis engine is configured to:
   a. analyze provisions of said financial derivative contract;
   b. decompose said provisions to a plurality of triggers and actions, wherein each trigger results in an action;
   c. analyze structured and unstructured data to automatically create an associated data and event model;
   d. create an event model for a financial derivative in said financial derivative contract;
   e. compare said data model and said event model to said plurality of triggers;
   f. apply said provisions to a semantic contract as a knowledge graph, wherein said knowledge graph comprises a directed labeled graph, comprising said structured and unstructured data;
   wherein said server gateway further comprises a blockchain bridge for storing said semantic contract as said knowledge graph on a blockchain, wherein said blockchain bridge reads a plurality of parameters for analyzing said financial derivative contract from said blockchain, and provides said parameters to said analysis engine for decomposing said provisions and creates a semantic smart contract; wherein said semantic smart contract comprises inferencing logic for supporting execution of said semantic smart contract through a plurality of different blockchain networks;
   wherein said blockchain bridge causes said semantic smart contract stored on said blockchain to execute to support execution of said financial derivative contract according to said triggers, and said analysis of said data model and said event model; wherein said semantic smart contract is executed according to said triggers, and said analysis of said data model and said event model; and wherein said semantic smart contract is executed through said blockchain network, through said inferencing logic;
   wherein said analysis engine further comprises at least one natural language processing algorithm and at least one additional machine learning algorithm, wherein said at least one additional machine learning algorithm is configured to determine a plurality of computational logic statements according to said provisions of said semantic contract; wherein said server gateway stores said provisions of said semantic contract with said computational logic statement; and wherein said server gateway executes at least one computational logic statement to execute said financial derivative contract.

2. The system of claim 1, wherein at least one trigger relates to an event occurring in a financial marketplace and wherein at least one action relates to transferring collateral to a party to said financial derivative contract.

3. The system of claim 1, wherein said server comprises a processor and a memory, wherein said processor comprises a hardware processor configured to perform a predefined set of basic operations in response to receiving a corresponding basic instruction selected from a predefined native instruction set of codes, that are stored in said memory, said memory comprising a first set of machine codes selected from the native instruction set for receiving parameters for said semantic contract, a second set of machine codes selected from the native instruction set for operating the analysis engine to analyze the parameters of the contract and a third set of machine codes selected from the native instruction set for interacting with blockchain nodes of said blockchain network.

4. The system of claim 3, wherein said third set of machine codes comprises a set of instructions for causing execution of said semantic smart contract stored on said blockchain nodes.

5. The system of claim 1, wherein said analysis engine is configured to: analyze at least one additional document and to further analyze said provisions of said financial derivative contract in view of said at least one additional document.

6. The system of claim 5, wherein said analysis engine is configured to: analyze relationships across different segments of a contract and across multiple related contracts.

7. The system of claim 1, wherein said analysis engine is configured to analyze said data model and said event model data model around derivatives agreements and event models on underlying products, and to automatically calculate associated risk.

8. The system of claim 7, wherein said analysis engine is configured to analyze operational terms and their values to further automatically calculate associated risk.

9. The system of claim 8, wherein said analysis engine is configured to analyze parties to said contract and to determine actions associated with said parties.

10. The system of claim 9, wherein said analysis engine is configured to analyze a currency or currencies specified in said contract.

11. The system of claim 10, wherein said analysis engine is configured to analyze one or more rules in said contract, and to determine application of triggers and actions according to said one or more rules.

12. The system of claim 11, wherein said analysis engine is configured to analyze said data model and said event model according to at least one regulation from at least one regulatory authority.

13. The system of claim 1, wherein said analysis engine is configured to:
   analyze provisions of said financial derivative contract to obtain a plurality of definitions, facts, covenants, rules, and calculation logic; and apply domain specific concept ontologies to said decomposed provisions and semantically classify them into intents and expected outcomes;
   wherein said analysis engine is further configured to:
   decompose said provisions by decomposing said intents to extract a plurality of triggers and actions, wherein each trigger results in one or more action; and analyzing said triggers to automatically create contract data model.

14. The system of claim 1, wherein said blockchain network operates according to a specific coding language.

15. The system of claim 14, wherein said specific coding language of said blockchain network comprises Go language on Hyperledger, or Solidity language on Ethereum.

16. A system for storing a financial contract on a blockchain, comprising a user computational device, a server gateway and a network, wherein said network connects said user computational device and said server gateway, wherein said server gateway comprises an analysis engine and a blockchain bridge, wherein said analysis engine is configured to:
   a. analyze provisions of said financial contract;
   b. decompose said provisions to a plurality of triggers and actions, wherein each trigger results in an action;
   c. analyze structured and unstructured data to automatically create an associated data and event model;
   d. create an event model for a financial derivative in said financial derivative contract;
   e. compare said data model and said event model to said plurality of triggers; and
   f. apply said provisions to a semantic contract as a knowledge graph, wherein said knowledge graph comprises a directed labeled graph, comprising said structured and unstructured data;
   wherein said server gateway further comprises a blockchain bridge for storing said semantic contract as said knowledge graph on a blockchain, wherein said blockchain bridge reads a plurality of parameters for analyzing said financial derivative contract from said blockchain, provides said parameters to said analysis engine for decomposing said provisions and creates a semantic smart contract; wherein said semantic smart contract comprises inferencing logic for supporting execution of said semantic smart contract through a plurality of different blockchain networks;
   wherein said blockchain bridge causes said semantic smart contract stored on said blockchain to execute to support execution of said financial derivative contract according to said triggers, and said analysis of said data model and said event model; wherein said semantic smart contract is executed according to said triggers, and said analysis of said data model and said event model; and wherein said semantic smart contract is executed through said blockchain network, through said inferencing logic;
   wherein said blockchain bridge is configured to store said triggers and actions on a blockchain;
   wherein said analysis engine is configured to apply said provisions of said financial contract to a semantic contract, said semantic contract being defined according to a semantic web of said provisions, and wherein said blockchain bridge is configured to store said semantic smart contract on said blockchain;
   and wherein said analysis engine further comprises at least one natural language processing algorithm and at least one additional machine learning algorithm, wherein said at least one additional machine learning algorithm is configured to determine a plurality of computational logic statements according to said provisions of said semantic web; wherein said server gateway stores said provisions of said semantic web with said computational logic statement; and wherein said server gateway executes at least one computational logic statement to execute said financial contract.

17. The system of claim 16, wherein said financial contract relates to a commercial loan, wherein at least one trigger relates to a material event for said loan as defined according to said financial contract.

18. The system of claim 17, wherein at least one trigger relates to an event occurring in a financial marketplace and wherein at least one action relates to a funding action for said financial contract.

19. The system of claim 16, wherein said blockchain bridge is further capable of reading a plurality of parameters for analyzing said financial contract from said blockchain, and of providing said parameters to said analysis engine for decomposing said provisions.

20. The system of claim 16, wherein said server gateway comprises a processor and a memory, wherein said processor comprises a hardware processor configured to perform a predefined set of basic operations in response to receiving a corresponding basic instruction selected from a predefined native instruction set of codes, that are stored in said memory, said memory comprising a first set of machine codes selected from the native instruction set for receiving parameters for said semantic contract, a second set of machine codes selected from the native instruction set for operating the analysis engine to analyze the parameters of the contract and a third set of machine codes selected from the native instruction set for interacting with blockchain nodes of said blockchain network.

21. The system of claim 20, wherein said third set of machine codes comprises a set of instructions for causing execution of said semantic smart contract stored on said blockchain nodes.

22. The system of claim 21, wherein said third set of machine codes invokes execution of said smart contract upon identification of a trigger by said analysis engine, wherein said execution of said smart contract causes said action associated with said trigger to be performed.

23. A system for creating and executing a semantic smart contract on a blockchain, the system comprising a plurality of user computational devices, a server gateway and a network, wherein said network connects said plurality of user computational devices and said server gateway, wherein each user computational device inputs at least one provision of a financial contract, wherein said server gateway comprises an analysis engine and a blockchain bridge, wherein said analysis engine comprises at least one natural language processing algorithm and at least one additional machine learning algorithm configured to:
   a. analyze said input provisions of said financial contract; and
   b. decompose said provisions to a plurality of triggers and actions, wherein each trigger results in an action;
   c. create a semantic smart contract as a knowledge graph embodying said triggers and actions, such that data input to said semantic smart contract evokes a trigger, which in turn causes execution of a related action; wherein said knowledge graph comprises a directed labeled graph, comprising said structured and unstructured data; wherein said semantic smart contract comprises inferencing logic for supporting execution of said semantic smart contract through a plurality of different blockchain networks;
   c. analyze structured and unstructured data to automatically create an associated data and event model;
   d. create an event model for a financial derivative in said financial derivative contract; and
   e. compare said data model and said event model to said plurality of triggers in said semantic smart contract;
   wherein said blockchain bridge is configured to store said semantic smart contract on the blockchain; and wherein said semantic smart contract is executed automatically through said blockchain network, according to input data, said data model and said event model.

24. The system of claim 23, wherein said at least one additional machine learning algorithm is configured to determine a plurality of computational logic statements according to said provisions of said semantic contract; wherein said server gateway stores said provisions of said semantic contract with said computational logic statement; and wherein said server gateway executes at least one computational logic statement upon input of said input data, to determine whether said semantic smart contract executes.

25. The system of claim 23, wherein said at least one additional machine learning algorithm is configured to determine a plurality of computational logic statements according to said provisions of said semantic contract; wherein said blockchain bridge stores said provisions of said semantic contract with said computational logic statement on the blockchain; and wherein said blockchain bridge causes at least one computational logic statement to execute upon input of said input data, such that execution of said at least one computational logic statement determines whether said semantic smart contract executes.

26. The system of claim 25, wherein said blockchain bridge is further capable of reading a plurality of parameters for analyzing said input provisions of said financial contract from said blockchain, and of providing said parameters to said analysis engine for decomposing said provisions.

27. The system of claim 26, wherein said plurality of provisions are connected in a semantic web, wherein said analysis engine further comprises at least one natural language processing algorithm and at least one additional machine learning algorithm, wherein said at least one additional machine learning algorithm is configured to determine a plurality of computational logic statements according to said provisions of said semantic web as analyzed by said at least one natural language processing algorithm; wherein said blockchain bridge causes said semantic smart contract and said computational logic to be stored on said blockchain for execution through said semantic smart contract; and wherein said server gateway causes execution of at least one computational logic statement to execute said financial contract.

28. The system of claim 27, wherein said server gateway comprises a processor and a memory, wherein said processor comprises a hardware processor configured to perform a predefined set of basic operations in response to receiving a corresponding basic instruction selected from a predefined native instruction set of codes, that are stored in said memory, said memory comprising a first set of machine codes selected from the native instruction set for receiving parameters for said semantic contract, a second set of machine codes selected from the native instruction set for operating the analysis engine to analyze the parameters of the contract and a third set of machine codes selected from the native instruction set for interacting with blockchain nodes of said blockchain network.

29. The system of claim 28, wherein said third set of machine codes comprises a set of instructions for causing execution of said semantic smart contract stored on said blockchain nodes, through said blockchain bridge.

30. The system of claim 29, wherein said third set of machine codes invokes execution of said smart contract upon identification of a trigger by said analysis engine, wherein said execution of said smart contract causes said action associated with said trigger to be performed.

31. A system for analyzing a financial derivatives contract, comprising a user computational device, a server gateway, and one of a distributed ledger network or blockchain network, wherein said network connects said user computational device and said server gateway, wherein said server gateway comprises an analysis engine, wherein said analysis engine is configured to:
   a. analyze provisions of said financial derivative contract;
   b. decompose said provisions to a plurality of definitions, facts, covenants, rules, and calculation logic;
   c. apply domain specific concept ontologies to said decomposed provisions and semantically classify them into intents and expected outcomes;
   d. decompose said intents and extract a plurality of triggers and actions, wherein each trigger results in one or more actions;
   e. analyze said triggers to automatically create contract data model;
   f. apply said triggers to a semantic contract as a knowledge graph, wherein said knowledge graph comprises a directed labeled graph;
   g. analyze provisions of a contractual event consumed in unstructured or structured data format;
   h. decompose said provisions of a contractual event into a plurality of actions;
   i. analyze said actions to automatically create an event model;
   j. apply said event model to the said contract model and enhance said knowledge graph to associate a plurality of triggers to actions;
wherein said server gateway further comprises a blockchain bridge for storing said semantic contract as said knowledge graph on a blockchain, wherein said blockchain bridge reads a plurality of parameters for analyzing said financial derivative contract from said blockchain, and provides said parameters to said analysis engine for decomposing said provisions and creates a semantic smart contract; wherein said semantic smart contract comprises inferencing logic for supporting execution of said semantic smart contract through a plurality of different blockchain networks;
wherein said blockchain bridge causes said semantic smart contract stored on said blockchain to execute to support execution of said financial derivative contract according to said triggers, and said analysis of said data model and said event model; wherein said semantic smart contract is executed according to said triggers, and said analysis of said data model and said event model; and wherein said semantic smart contract is executed through a said blockchain network, through said inferencing logic;
wherein said analysis engine further comprises at least one natural language processing algorithm and at least one additional machine learning algorithm, wherein said at least one additional machine learning algorithm is configured to determine a plurality of computational logic statements according to said provisions of said semantic contract; wherein said server gateway stores said provisions of said semantic contract with said computational logic statement; and wherein said server gateway executes at least one computational logic statement to execute said financial derivative contract.

* * * * *